US010108766B2

(12) United States Patent
Druckman et al.

(10) Patent No.: US 10,108,766 B2
(45) Date of Patent: Oct. 23, 2018

(54) METHODS AND APPARATUS FOR ANALYZING FATIGUE OF A STRUCTURE AND OPTIMIZING A CHARACTERISTIC OF THE STRUCTURE BASED ON THE FATIGUE ANALYSIS

(71) Applicant: The Boeing Company, Chicago, IL (US)

(72) Inventors: Micah D. Druckman, Seattle, WA (US); Milan Stefanovic, Everett, WA (US); Omid B. Nakhjavani, Mill Creek, WA (US)

(73) Assignee: THE BOEING COMPANY, Chicago, IL (US)

(*) Notice: Subject to any disclaimer, the term of this patent is extended or adjusted under 35 U.S.C. 154(b) by 1014 days.

(21) Appl. No.: 14/533,942

(22) Filed: Nov. 5, 2014

(65) Prior Publication Data

US 2016/0125107 A1    May 5, 2016

(51) Int. Cl.
  *G06F 17/10*    (2006.01)
  *G06F 17/50*    (2006.01)

(52) U.S. Cl.
  CPC ...... *G06F 17/5018* (2013.01); *G06F 17/5095* (2013.01); *G06F 2217/46* (2013.01)

(58) Field of Classification Search
  CPC .................................................. G06F 17/5018
  USPC .......................................................... 703/2
  See application file for complete search history.

(56) References Cited

U.S. PATENT DOCUMENTS

| 6,862,539 B2 | 3/2005 | Fields et al. |
| 7,685,313 B1 | 3/2010 | Kanevsky et al. |
| 9,524,301 B2 | 12/2016 | Nakhjavani et al. |
| 2009/0171972 A1 | 7/2009 | McGeehan |
| 2016/0076516 A1* | 3/2016 | Butterworth ............ F03D 7/022 416/1 |

OTHER PUBLICATIONS

Goranson, Ulf G., by The Boeing Company, "Fatigue issues in aircraft maintenance and repairs," Feb. 10, 1997, Int. J. Fatigue vol. 20, No. 6, pp. 413-431, Elsevier Science Ltd., Great Britain, last retrieved from http://www.hf.faa.gov/hfmaint/portals/1/science10.pdf on Mar. 6, 2015.
United States Patent and Trademark Office, "Non-Final Office Action," issued in connection with U.S. Appl. No. 14/266,462, dated May 6, 2016, 8 pages.

* cited by examiner

*Primary Examiner* — Andy Ho
(74) *Attorney, Agent, or Firm* — Hanley, Flight & Zimmerman, LLC

(57) ABSTRACT

Methods and apparatus for analyzing fatigue of a structure and optimizing a characteristic of the structure based on the fatigue analysis are disclosed herein. An example method disclosed herein includes obtaining mass and unit stress values of a plurality of details of interest of a structural component, calculating fatigue margins for each of the details of interest, identifying among the calculated fatigue margins any negative fatigue margins associated with one or more of the details of interest, and adjusting, via a processor, a dimensional characteristic of each detail of interest associated with the negative fatigue margin(s) until positive fatigue margin(s) at each detail of interest is obtained.

20 Claims, 17 Drawing Sheets

METHODS AND APPARATUS FOR ANALYZING FATIGUE OF A STRUCTURE AND OPTIMIZING A CHARACTERISTIC OF THE STRUCTURE BASED ON THE FATIGUE ANALYSIS

FIELD

The present disclosure relates generally to fatigue and structural analysis and, more particularly, to methods and apparatus for analyzing fatigue of a structure and optimizing a characteristic of the structure based on the fatigue analysis.

BACKGROUND

Structural components such as aircraft or airframes, automobiles, bridges, etc., are subjected to various types of forces throughout their intended design life. These forces create stresses that can cause wear, damage, and/or the possible failure of the structure. Thus, fatigue and structural analysis of many structural components or structural elements are conducted to ensure that the structure can withstand operational stresses caused by forces imparted to the structure during its intended useful life. For example, fatigue and structural analyses provide critical information that can be used to determine the likelihood and/or causes of fatigue related structural failures. The fatigue and structural analyses help determine design criteria (e.g., dimensional values such as thickness) to enable the structure to withstand anticipated stresses or operational loads over the life of the structure.

Fatigue and structural analyses are particularly important for structures that are subject to extreme forces or loads over the life of the structures. For instance, aircraft structures experience a variety of intense forces during repeated flight envelopes as they repeatedly take off, fly, perform various maneuvers, and/or land) over the life of the aircraft. These forces create stresses within the structure and, thus, the structures must be manufactured to safely withstand these anticipated stresses throughout its intended life.

SUMMARY

An example method disclosed herein includes obtaining mass and unit stress values of a plurality of details of interest of a structural component, calculating fatigue margins for each of the details of interest, identifying among the calculated fatigue margins a negative fatigue margin associated with at least one particular detail of interest, and adjusting, via a processor, a dimensional characteristic of only the particular detail of interest associated with the negative fatigue margin until a positive fatigue margin at the detail of interest is obtained.

An example apparatus disclosed herein includes a processor and a memory comprising coded instructions that, when executed, cause a machine to obtain mass and unit stress values of a plurality of details of interest of a structural component, calculate fatigue margins for each of the details of interest, identify among the calculated fatigue margins a negative fatigue margin associated with one of the details of interest, and adjust, via a processor, a dimensional characteristic of the detail of interest associated with the negative fatigue margin until a positive fatigue margin at the detail of interest is obtained.

The features, functions and advantages that have been discussed can be achieved independently in various embodiments or may be combined in yet other embodiments further details of which can be seen with reference to the following description and drawings.

Figure 1:
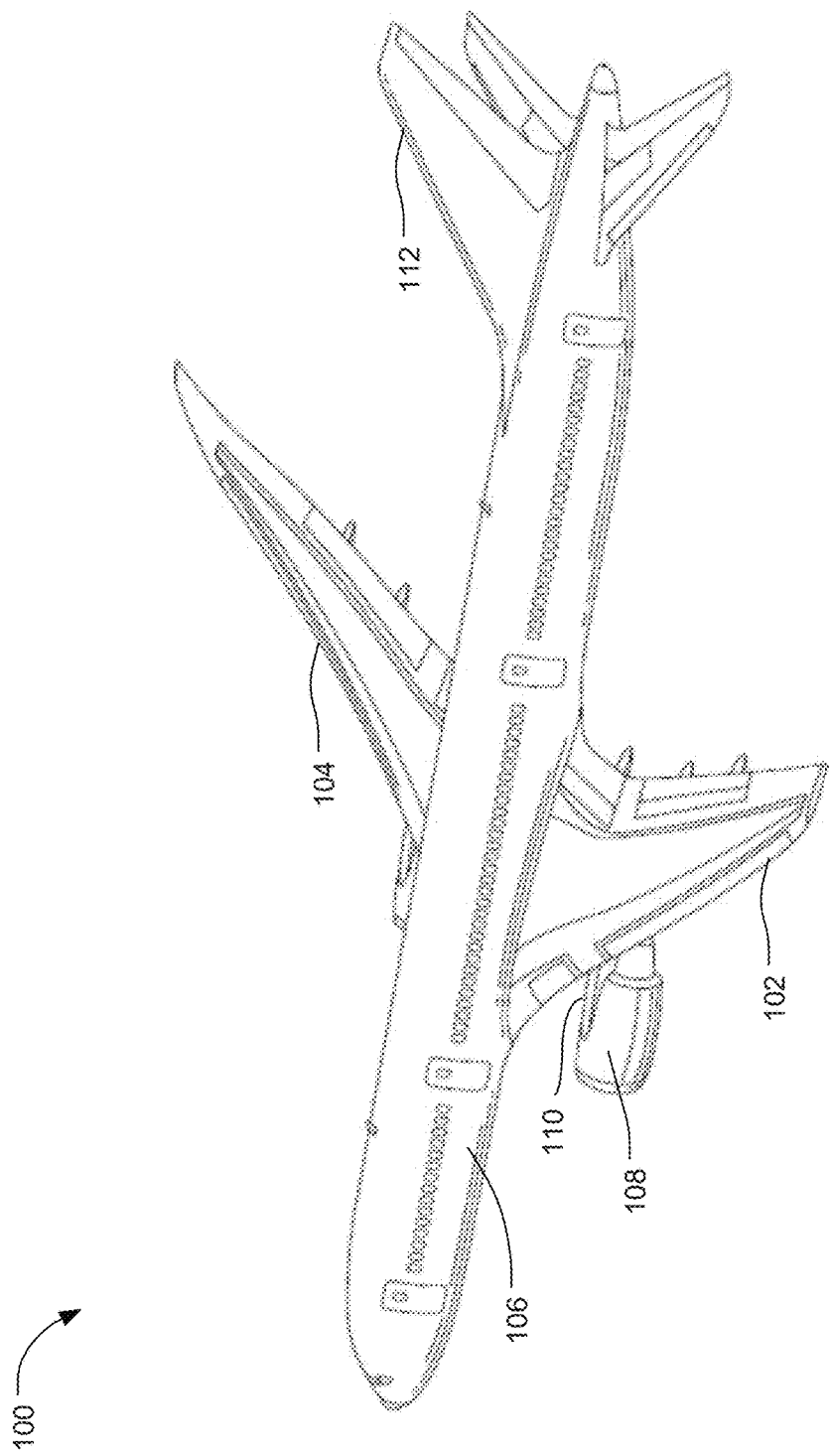
FIG. 1 illustrates an example aircraft having a structural component that may be analyzed using the example methods and apparatus in accordance with the teachings disclosed herein.

Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in direct contact with another part means that there is no intermediate part between the two parts.

DESCRIPTION

Analytical tools are often used to perform fatigue and structural analyses of structural components. For example, analytical tools are often employed to design and verify an ultimate strength of a structure (e.g., for specified flight envelopes) and to design a structure to sustain fail-safe loads with limited damage for a period of service prior to detection and repair of the structure. These analytical tools typically include customized computer programs for a specific structural design (e.g., a particular component of a commercial aircraft).

In some examples, the fatigue and structural analyses help determine fatigue allowables (i.e., the maximum repeated stress a structural component can withstand without failure) for each specific structural element or detail of interest. Development of fatigue allowables involves determining an anticipated loading throughout the design life of each component and generating a fatigue life prediction of each component based on loading and material properties of the component. These fatigue allowables are often referred to as SN curves (stress per number of cycles) and they define a life of a structure at any given level of stress. Once the fatigue allowables are determined or known, a structural component and/or structural element may be designed to withstand forces or stresses based on the anticipated operating stresses or loads over its intended service life. For example, a maximum stress expected to be imparted on a structural component is often determined based on a current configuration and/or dimensional envelope and is compared to the fatigue allowable to determine a fatigue margin for the detail of interest. The fatigue margin, for example, is determined by dividing the allowable stress by the operating stress and subtracting 1 from the value. For example, a stress value of a specific element of a structural component that provides a positive fatigue margin when compared to the fatigue allowable (e.g., provides a positive value) is representative of the structural component being capable of withstanding a certain stress threshold to attain reliability and life goal requirements of the structural element or detail of interest.

In some examples, such an analysis may result in a negative stress margin. For example, a stress value of a specific element of the structural component that provides a negative fatigue margin when compared to the fatigue allowable is representative of the structural component being unable to withstand the maximum operating stress (e.g., a stress more than the fatigue allowable value) while meeting life goal requirements. Negative margins provide an indication of the inadequacy of a structural design and may prompt independent assessments of the design, a redesign of the component(s) and/or element(s), or both. Thus, if the component is determined to have an inadequate fatigue life (e.g., a negative margin), the component must be reconfigured or redesigned by, for example, increasing a dimensional value such as a thickness of a structural element or a component. The analysis to determine a maximum operating stress and fatigue margin may then be repeated based on the reconfigured parameters and/or modified dimensional values.

Typically, to correct a structural component having a negative margin, a characteristic(s) (e.g., a dimensional characteristic(s) such as a diameter and/or a thickness, a material property, a type of material, etc.) is modified locally at the structural element or detail of interest (e.g., a portion of the structural component) having a negative fatigue margin. The determination of dimensional modifications needed to correct the fatigue margins is often a manual process involving extensive trial and error analyses. In an effort to reduce the costs associated with the manual process, the local characteristic(s) of the detail of interest are modified iteratively until the margin is positive without regard to the weight impact due to these changes. If there are many negative fatigue margins, the process of manually fixing them with adjustments to dimensional characteristics of the details of interest can become too complex for the human brain to efficiently solve. In these cases, a dimensional characteristic such as, for example, a thickness of an entire component, rather than distinct thicknesses at a few locations, may be increased which can significantly and unnecessarily increase weight and/or cost of the structural component.

Further, some known systems lack a method to organize and/or track the various data files and/or fatigue parameter information provided by different software programs. In some known examples, significant manual work is used to prepare input files to a fatigue pre-processing program (e.g., one for reference stresses and one for bearing stresses). In addition, some known programs are unable to determine biaxial stress effects on the structural components or details of interest. Further, certain fatigue parameters such as Detail Fatigue Rating (DFR) values for determining fatigue allowables and, thus, fatigue margins are dependent on fatigue stresses that are not known until execution of the fatigue analysis program or process is complete. The DFR value is a quantitative value that may be developed based on a comprehensive inventory of service and test-proven design allowables based on a family of damage curves for various mean and alternating stress combinations uniquely defined by given DFR values. For example, the DFR values may be graphed with an SN curve and/or any other curve or graph to provide fatigue allowables (i.e., maximum stress Fmax), stress ratio value (R), and/or cycles. Such DFR values permit quantitative compilation of the cumulative fatigue of previous designs. As a result, fatigue margins are calculated once the DFR value is known. Significant manual work is often required for post-processing the fatigue analysis program results and calculating the correct fatigue margins based on the DFR value. Further, in some known systems, correction of negative fatigue margins is conducted by trial and error and does not account for weight efficiency, especially for a higher number of fatigue margins.

The example methods and apparatus disclosed herein perform an analysis of a structural component and/or a structural element of interest to determine or identify localized negative fatigue margin at details of interests. As part of this analysis, a finite element model is used with parametric dimensional characteristics that can be modified locally. In this manner, a dimensional characteristic of the structural element may be modified (e.g., increased or decreased) only at a location(s) associated with the negative fatigue margin(s) (e.g., gauging up or increasing a thickness at a location). As a result, the example apparatus and methods disclosed herein enable the elimination of areas having negative fatigue margins while enabling optimization of the weight and cost of the component modified.

For example, the example methods and apparatus disclosed herein perform an analysis of a structural component and/or a structural element of interest to determine a mass and/or unit stresses of the structural component, the unit stresses later being converted to operating stresses. The operating stress values provided from the analysis are then compared to fatigue allowables. The fatigue allowables, for example, identify for any level of operational stress a minimum fatigue life that can be exceeded by all but the weakest member of a structural component. In some examples, the fatigue allowables are developed empirically from fatigue test results of structurally representative specimens subject to realistic operational loads. The fatigue allowables, for example, may be provided by determining an anticipated loading of a structural element over time and, based upon the anticipated loading of the structural element over time, determining the maximum allowable stress to which the structural element may be subjected during the intended life of the structural element. A comparison of the operational stress values provided by the fatigue analysis with the fatigue allowables can determine if a structural element or detail of interest has a positive margin (e.g., a satisfactory amount of stress the structural element can withstand) or a negative fatigue margin (e.g., an unsatisfactory amount of stress that the structural element can withstand). If the analysis of an element of interest provides a positive margin (e.g., allowable stresses or loads higher than anticipated loads or stresses during a flight envelope or design life of the aircraft), then the analyzed component and/or element may be determined to have sufficient dimensional characteristics. In some examples, when a positive fatigue margin of an element of interest is detected, the example methods and apparatus may be employed to analyze the element to determine if a local thickness (e.g., a thickness of at least one particular location or detail of interest on the element being analyzed) may be reduced while still providing a positive fatigue margins. In other words, the example methods and apparatus may be employed to optimize a dimensional envelope of a structural element even when all the fatigue margins are initially found to be positive. In some examples, if a negative fatigue margin is detected during the analysis of the element of interest, a fatigue analysis module calculates an adjusted dimensional characteristic(s) (e.g., a shell element thickness) at least one particular location having a negative fatigue margin. In some examples, the methods and apparatus disclosed herein modify or adjust a dimensional value or characteristic (e.g., a shell element thickness) only at the particular locations for which a negative fatigue margin value was calculated and/or identified. The example methods and apparatus disclosed herein then perform another fatigue analysis of the element of interest using the modified dimensional characteristic(s) and further dimensional adjustments and subsequent fatigue analyses are automatically and iteratively performed until all local areas of interest provide positive fatigue margins. Accordingly, the example method disclosed herein performs a finite element analysis of a finite element model of the structural component defining a plurality of particular details of interest to obtain the mass and unit stress values of each of the particular details of interest, wherein the method individually adjusts a dimensional characteristic for each of the plurality of particular details of interest respectively until a positive fatigue margin at each particular detail of interest is obtained, such that a structural component with a positive fatigue margin is obtained with minimal impact to a weight of the structural component. The example method may further comprise the step of producing the optimized structural component having one or more adjusted dimensional characteristics for one or more particular details of interest, such that a structural component with a positive fatigue margin and minimal weight is obtained. The structural component may be produced, for example, using Numerical Controlled equipment for laying up composite materials to form one or more details of interest of the structural component to a particular dimensional thickness, or for machining one or more details of interest of the structural component to a particular dimensional thickness. The structural component may also be produced by three-dimensional printing equipment, additive manufacturing equipment for incrementally adding material to adjust the dimensional thickness of one or more details of interest of the structural component, or other similar equipment suitable for producing the structural component.

FIG. 1 illustrates an example aircraft 100 including right and left wings 102, 104 extending laterally outward from a fuselage 106. Each of the wings 102, 104 of the illustrated example supports an aircraft engine 108 that is coupled to the wings 102, 104 via a pylon 110. Each of the wings 102, 104, the fuselage 106, the pylon 110, an empennage 112, and/or other aircraft structures include an aircraft frame assembly formed by frames, chords, beams, skins, fasteners, etc. The aircraft frame structures experience a variety of intense forces during a flight envelope and/or life of the aircraft 100 (e.g., take-off, maneuvering, landing, turbulence, ground-air-ground cycles, etc.). These forces create internal stresses in the aircraft frame structures, which may cause wear, damage, and/or possible failure of the structure if the aircraft frame structures cannot withstand the anticipated stresses. Thus, the aircraft frame structures are often evaluated using fatigue and structural analyses techniques to ensure that the aircraft frame structures can withstand the forces imparted to the aircraft 100 during the intended design life of the aircraft 100. Finite Element Model (FEM) techniques are often employed to determine the stresses imparted to an aircraft frame structure and subsequent fatigue analysis codes are often employed to determine the maximum operating stresses the aircraft frame structure can withstand over its intended service life. Additionally or alternatively, although an aircraft is provided as an example herein, other structures such as, for example, vehicles (e.g., automobiles, machinery, etc.), buildings, bridges, pressure vessels, and/or any other structure may be analyzed using the example methods and apparatus disclosed herein.

Figure 2A:
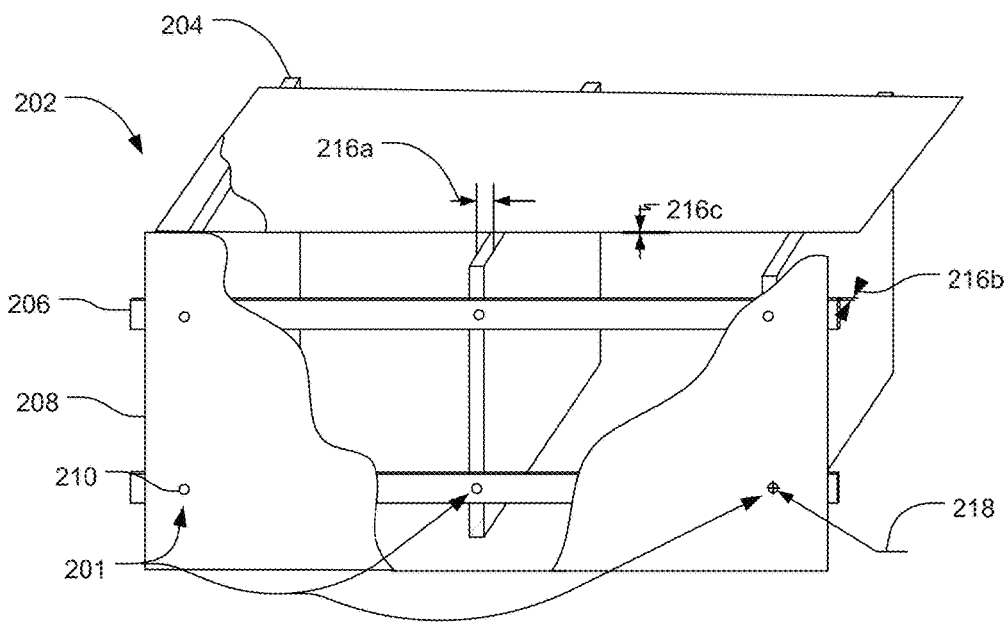
FIG. 2A illustrates an example structural component of the example aircraft of FIG. 1 that may be analyzed in accordance with the teachings disclosed herein.

FIG. 2A is a partially sectioned view of an engine strut structure 202 of the example pylon 110 of FIG. 1 that may be analyzed using the example methods and apparatus disclosed herein. For example, the pylon 110 is subjected to various forces such as, for example, thrust loads from the engine 108, engine twist and/or windup loads, loads during take-offs and landings, aircraft maneuvering, turbulence, etc. Referring to FIG. 2A, the engine strut structure 202 of the illustrated example includes, for example, a frame 204, a chord 206 and a skin 208 that are coupled via, for example, fasteners 210 (e.g., Hi-Lok fasteners).

Figure 2B:
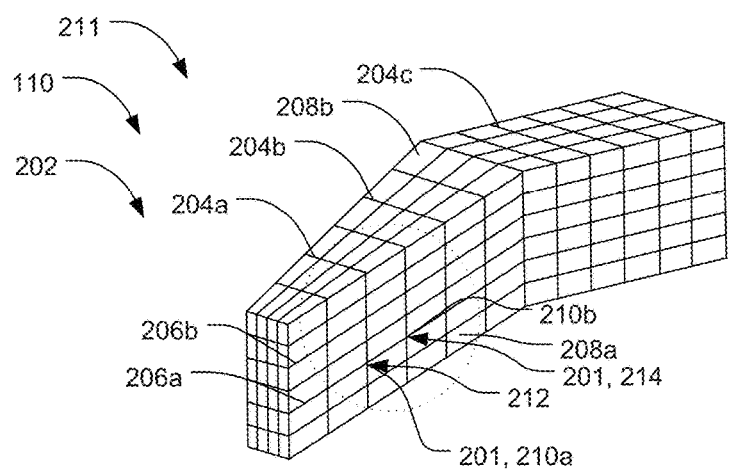
FIG. 2B illustrates an example finite element model of an example structural component of FIG. 2A and the example aircraft of FIG. 1

FIG. 2B illustrates a finite element model of the example engine strut 202. When performing a finite element analysis, a structure component 211 (e.g., the engine strut 202) is analyzed or divided into individual structural elements or details of interest 201 such as, for example, a joint, a node, an open hole of a plate, a lug detail, etc. For example, in the example shown in FIG. 2B, the example engine strut 202 may include a plurality of different elements of interest 201. For example, each frame 204a, 204b, 204c, each chord 206a, 206b, each skin 208a, 208b and/or each fastener 210a, 210b, may be or contain an element of interest 201 for which fatigue and/or stress analysis may be evaluated. For example, an element of interest 201 may be a joint 212 of the engine strut 202 including the fastener 210a, the frame 204a, the chord 206a and the skin 208a. Another element or detail of interest 201 may be a joint 214 where the fastener 210b couples the chord 206b and the skin 208b. Thus, when evaluating fatigue, loads and/or stresses that the example engine strut 202 can withstand, the structural elements of interest 201 may be evaluated at specific locations (e.g., the joints 212 and 214) of the structural component 211 (e.g., the engine strut 202). The amount of stresses that the frame 204, the chord 206, the skin 208 and/or the fastener 210 can withstand may be dependent on a dimensional characteristic(s) (e.g., a thickness 216a of the frame 204, a thickness 216b of the cord 206, a thickness 216c of the skin 208, a diameter 218 of the fastener 210, etc.). A dimensional characteristic(s) may be modified to adjust (e.g., increase or decrease) the amount of stresses and/or loads that the structural component 211 and/or the structural elements or details of interest 201 can withstand.

Although increasing a dimensional characteristic(s) (e.g., the thicknesses 216a-c, the diameter 218, a stack-up thickness defined by the thicknesses 216a-c at the joint 212, etc.) increases an amount of stress that the structural component 211 can withstand, the increased dimensional characteristic(s) can causes an increase in the weight of the structural component 211 (e.g., the engine strut 202), resulting in increased fuel costs and/or manufacturing costs. Additionally, increasing a dimensional characteristic(s) can cause load transfer such that other fatigue details become more critical and may even have a positive fatigue margin become negative. Thus, simply increasing a dimensional characteristic(s) manually by trial and error in order to solve a negative fatigue margin(s) may be inefficient. Although not shown, other components of the aircraft 100 may be analyzed using the methods and apparatus disclosed herein such as, for example, a wing box structure, a fuselage structure, a wing structure, etc. Further, in some examples, any other structure such as, for example, a building, an automobile structure or detail of interest, pressure vessel etc., may be analyzed via the methods and apparatus disclosed herein.

Figure 3:
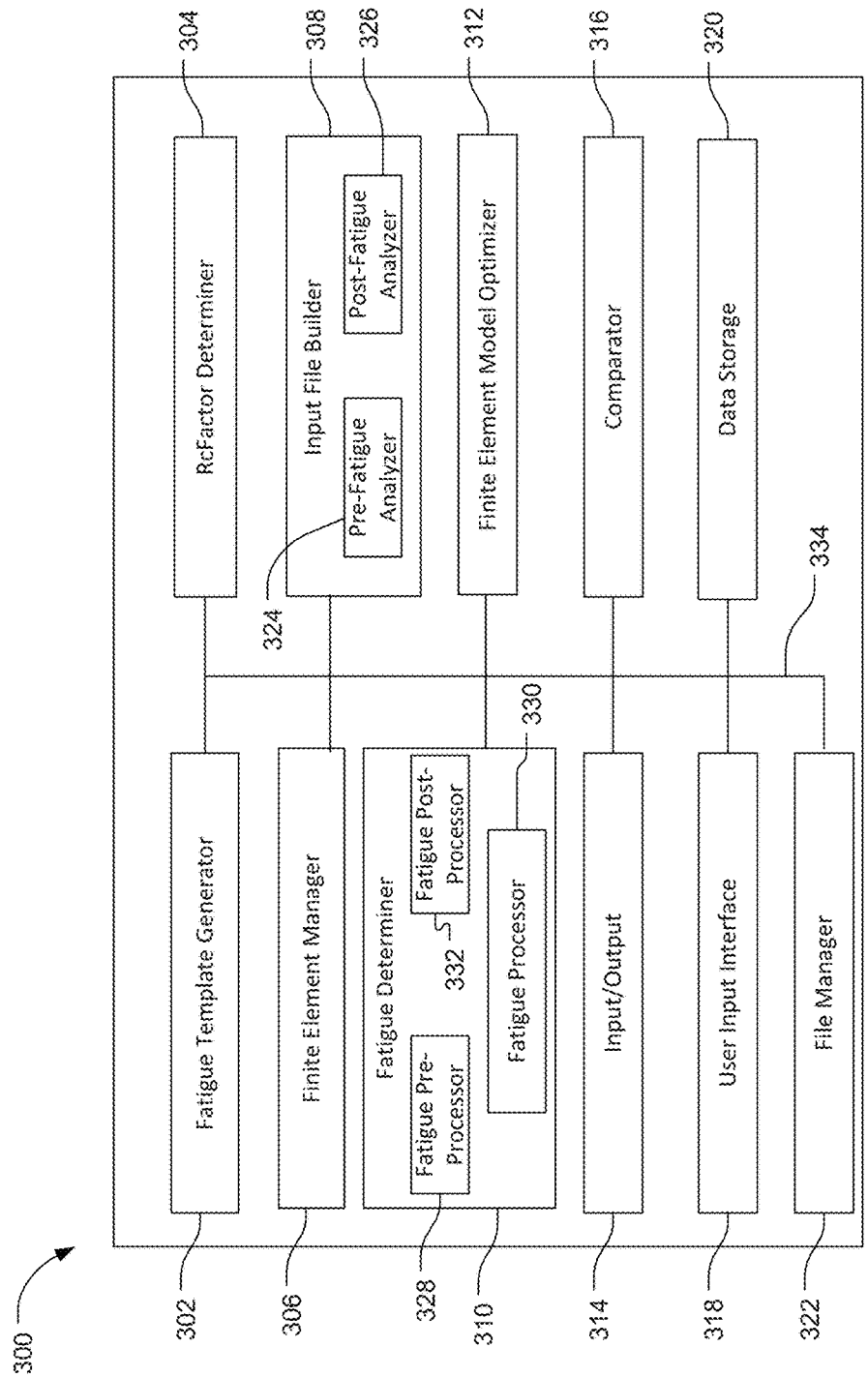
FIG. 3 illustrates a block diagram of an example fatigue analyzer system in accordance with the teachings disclosed herein.

FIG. 3 is a block diagram representative of an example fatigue analyzer system 300 in accordance with the teachings disclosed herein. The example fatigue analyzer system 300 of the illustrated example provides a fatigue analysis and/or a fatigue optimization of a structural element of interest. For example, the example fatigue analyzer system 300 determines a fatigue margin of a detail of interest by comparing an operating stress imparted to a detail of interest with a fatigue allowable associated with the detail of interest. More specifically, the example fatigue analyzer system 300 of the illustrated example calculates fatigue margins at all desired or selected structural elements or details of interest (e.g., the details of interest 201, the joints 212, 214, etc.) using, for example, a fatigue margin equation. A fatigue margin equation may be any known fatigue margin equation. A fatigue margin may be determined using an example safety margin equation:

$$\text{Fatigue Margin} = (F\text{max}/f\text{max}) - 1; \quad \text{Equation 1}$$

where, Fmax is the maximum allowable stress (e.g., fatigue allowable) and fmax is the maximum fatigue stress across all flight segments. The maximum allowable stress is the largest repeated stress that may be imparted to the structural element without resulting in a premature failure. In some examples, the maximum allowable stress and the actual stress are determined at the same reference condition for the structural element at issue.

The fatigue allowable or the maximum allowable stress may be developed or determined by determining an anticipated loading for the design life of each component or detail and generating a fatigue life prediction of each component based on the loading and material properties of the component or detail. For example, the maximum allowable stress (Fmax) may be calculated or determined based on material constants, DFR, which represents fatigue capability of a specific detail of interest under analysis, a minimum-to-maximum fatigue stress ratio, ground-air-ground damage ratio (fraction of fatigue damage caused by the ground-air-ground cycle that represents largest stress excursion (minimum-to-maximum) per flight), and service goal (number of flights). The DFR is calculated or determined based on stress-dependent parameters and stress-independent parameters as described in greater detail below. Specifically, the DFR is a quantitative measure that may be used to determine fatigue allowables. However, in other examples, the fatigue analyzer system 300 may be employed to determine fatigue margins and/or other stress values based on other equations, parameters, constants, etc.

To determine the fatigue margin and optimize a detail of interest, the example fatigue analyzer system 300 of the illustrated example generally determines mass and/or unit stresses of a structural component. The example fatigue analyzer system 300 of the illustrated example is described in connection with a structural component such as, for example, the engine strut 202 of FIG. 2B. The example fatigue analyzer system 300 of the illustrated example determines if at least one particular location or detail of interest has a negative fatigue margin on the structural component or model. In the cases where at least one negative margin is found, the fatigue analyzer system 300 calculates and/or adjusts (e.g., optimizes) a detail of interest or element thickness at only a particular location having a negative fatigue margin, to have adequate stiffness properties at detected negative fatigue margin locations with minimal impact to a weight of the structural component.

To determine a fatigue margin of a structural detail of interest 201, the example the fatigue analyzer system 300 of the illustrated example includes a fatigue template generator 302, a RcFactor determiner 304, a finite element manager 306, an input file builder 308, a fatigue determiner 310, a finite element model optimizer 312, an input/output interface 314, a comparator 316, a user input interface 318, a data storage 320 and a file manager 322. The example input file builder 308 of the illustrated example includes a pre-fatigue analyzer 324 and a post-fatigue analyzer 326. In addition, the example fatigue determiner 310 of the illustrated example includes a fatigue pre-processor 328, a fatigue processor 330, and a fatigue post-processor 332. The example fatigue template generator 302, the example RcFactor determiner 304, the example finite element manager 306, the example input file builder 308, the example fatigue determiner 310, the example finite element model optimizer 312, the example input/output interface 314, the example comparator 316, the example user input interface 318, the example reference data storage 320, the example file manager 322, the example pre-fatigue analyzer 324, the example post-fatigue analyzer 326, the example fatigue pre-processor 328, the example fatigue processor 330, and the example fatigue post-processor 332 are communicatively connected via an example communication bus 334. In some examples, the example fatigue analyzer system 300 may communicatively couple to multiple systems, client servers, application servers (e.g., remote computer systems, servers, etc.), etc., via, for example, the input/output interface 314. In some examples, an analysis and/or output provided by the fatigue analyzer system 300 may be provided across multiple software programs and/or operating systems. In some examples, the fatigue analyzer system 300 interacts directly with other computer programs hosted on different computers or systems and/or is capable of modifying, translating and/or configuring inputs and/or outputs provided by a different computer program.

The fatigue analyzer system 300 of the illustrated example receives information and/or a finite element model for fatigue analysis. For example, a user may input information on fatigue details of interest (e.g., file Fatigue template) and/or a finite element model as a file (e.g., file FEM1) via the user input interface 318 and/or the input/output interface 314. For example, the input files (e.g., Fatigue template and FEM1) may provide information to the fatigue analyzer system 300 regarding specific structural component(s) and/or structural element(s) of interest for fatigue analysis. For example, the user input interface 318 may enable selection of any structural component(s) and/or structural element(s) or detail(s) of interest for which fatigue analysis is to be performed by the fatigue analyzer system 300. For example, the user input interface 318 may enable selection of a structural component (e.g., the frame 204, the cord 206, the skin 208, etc.), a structural element (e.g., the joint 212 defined by the frame 204a, the cord 206a, the skin 208a and the fastener 210a) and/or a detail of interest (e.g., the fastener 210a, a hole in the frame 204a that receives the fastener 210a, etc.). Any number of structural component(s), structural element(s) and/or details of interest may be selected for analysis. In some examples, the user input interface 318 may provide a graphic illustration of the finite element model of, for example, the engine strut 202 shown in FIG. 2B and enables a user to select (e.g., via a touch input) the structural component(s) and/or the structural element(s) or detail(s) of interest. In some examples, the user input interface 318 provides a drop down list to enable selection of the structural component(s) and/or structural element(s) or detail(s) of interest for analysis. Thus, each structural element such as, for example, the frame 204a, the chord 206a, the skin 208a and/or the fastener 210a at a specific interface or detail of interest 201 may be analyzed by the example fatigue analyzer system 300 of FIG. 3.

In the illustrated example, the fatigue analyzer system 300 (e.g., via the user input interface 318) receives information regarding unit stress responses for selected structural components and/or structural element(s) or detail(s) of interest to be determined or calculated (e.g., via the FEM1 file input). For example, the unit stress responses identify and/or indicate the stress values corresponding to each detail of interest that the fatigue analyzer system 300 is to calculate or determine. For example, the unit stress response values may be a stress value in an x-axis direction, a y-axis direction, a shear direction, and/or any other direction.

Additionally, the fatigue analyzer system 300 also obtains or retrieves information and/or characteristic(s) regarding the structural element(s) or detail(s) of interest. For example, the user input interface 318 enables input of material characteristic(s), dimensional characteristic(s), constant(s), ratio(s), stress-independent detail fatigue rating constant (DFR) value, and/or any other variable(s) or characteristic(s) pertaining to the selected element(s) of interest that may be needed during fatigue analysis. For example, the user input interface 318 may receive, and/or the fatigue analyzer system 300 may obtain (e.g., via the data storage 320 or a network), information regarding material type (e.g., aluminum, steel, composite, material mass, etc.), plate thickness, fastener diameter, stack-up thickness, a type of hole, fillet, or cutout, a diameter of a hole, a diameter of a fastener, a shape of the hole (e.g., circular, elliptical, etc.), modulus of elasticity of a fastener (e.g., the fastener 210) for each detail and/or joint of interest, and/or any other information or parameter(s) associated with each structural element or detail of interest selected for analysis. For example, the fatigue analyzer system 300 may receive information from a material property card based on a user selected material type under analysis.

In the illustrated example, the fatigue analyzer system 300 receives values of stress per unit load corresponding to a finite element model under analysis. For example, the fatigue analyzer system 300, the finite element manager 306 and/or the file manager 322 receives information from a finite element model such as, for example, the finite element model of the example engine strut 202 of FIG. 2B. The information received from the finite element model may be based on the input file (e.g., FEM1) provided to a finite element model program. Although the example finite element model of the example engine strut 202 of FIG. 2B has not yet undergone fatigue analysis under operating conditions, output from analysis of the finite element model provides values of stresses based on a unit load (e.g., a unit load having scale factor of 1) for the example structural details of interest indicated in the finite element model input file (e.g., FEM1). For example, the unit loads are applied at center of gravity locations of the example finite element model such as, for example, the example strut 202 of FIG. 2B. A unit load output file (e.g., an FE output file) having unit load stress information may be provided by the finite element modeling program to the finite element manager 306. The finite element manager 306 and/or the file manager 322, in some examples, obtains the values of stress per unit load (e.g., the FE output file) from the finite element modeling program performing the finite element model analysis (e.g., hosted on a different computer platform). For example, the example finite element manager 306 of the illustrated example, via the input/output interface 314, may instruct a program communicatively coupled to, but remotely located from, the fatigue analyzer system 300 to perform and/or retrieve the unit load stress values prior to analysis by the example fatigue analyzer system 300 and may modify and/or translate the results to output as the unit load output file (e.g., the FE output file). The finite element manger 306 and/or the file manager 322 may retrieve the unit load stress output values provided by a finite element model program via, for example, a web server (e.g., communicatively coupled via wireless, internet, etc.). In some examples, the file manager 322 stores the unit load stress values provided by a finite element model program in the data storage 320. In some examples, the finite element manager 306 and/or the fatigue analyzer system 300 of the illustrated example may be configured to analyze the finite element model input file and determine and/or calculate the values of stress per unit load instead of retrieving the values from another finite element modeling program. The unit load output file (e.g., the FE output file) may be communicated to the file manager 322.

The fatigue template generator 302 generates a template file containing information needed for the pre-fatigue analysis. Specifically, in some fields, the fatigue template generator 302 includes placeholder identification values representative of the values to be determined by the fatigue determiner 310 and/or the finite element model optimizer 312. For example, the fatigue template generator 302 receives the finite element model input file (e.g., FEM1 file) to determine which details of interest are to undergo analysis. For example, stress values and/or fatigue margins for each detail of interest indicated in the finite element model input file (FEM1) are identified by the fatigue template generator 302, and the fatigue template generator 302 identifies placeholders in the form of stress response IDs for each of the stress values and/or fatigue margin values to be calculated. The fatigue template generator 302 also identifies from the finite element model input file (FEM1) other information or data needed for post-fatigue analysis such as, for example, detail fatigue rating values independent of fatigue operating stresses, dimensional characteristic(s), material characteristic(s), etc.

Load distribution of a bearing stress imparted to a fastener and a stress concentration imparted to a plate of a joint may have a large impact on factors that affect the strength and fatigue life of the joint. Thus, for each structural element(s) or detail(s) of interest, the example fatigue template generator 302 generates a template file (e.g., a fatigue template) including a reference stress value (fref) and a bearing stress value (fbr) in an x-axis direction, y-axis direction, shear stress directions, etc., that will be calculated and output during analysis provided by the fatigue determiner 310. In some examples, the reference stress value (fref) represents far-field stresses applied to the boundaries defined by an element of the selected detail (e.g., a load across a defined area and/or volume of the detail). In some examples, the bearing stress (fbr stress) corresponds to local stresses imparted to a fastener at, for example, a joint, where a flexibility of the fastener is represented by a spring constant in the analysis.

Thus, in the illustrated example, for each detail(s) of interest, the fatigue template generator 302 constructs unique names based on collector ID, node ID, and stress component (x, y or shear) for each detail of interest selected for analysis (e.g., via the FEM1 file). Additionally, for each detail of interest, the fatigue template generator 302 determines identification (ID) numbers of spring element and bar element properties for each fastener (e.g., each hi-lock fastener) that is selected for analysis. In some examples, for each detail of interest, the fatigue template generator 302 determines ID numbers for each shell element property of each selected detail of interest (e.g., a plate thickness for each joint). Thus, an example fatigue template may include names/identifications of each of the details of interest selected for analysis (e.g., via the FEM1 file), a material type for each detail of interest selected, a loading type for each detail of interest selected (e.g., axial or shear loading), a stress response ID for each detail of interest selected, stress-independent DFR parameters, spring element and bar element property identifications for each detail, and shell element property identifications for plates at each joint pertaining the selected detail of interest, etc. The shell and bar element property identification for each joint may reflect a thickness of plates forming the joint (e.g., the thickness 216a of the frame 204, the thickness 216b of the chord 206, the thickness 216c of the skin 208), or a diameter at the joint (e.g., the diameter 218 of the fastener 210, a diameter of a hole in the frame 204, the chord 206 and/or the skin 208 that receives the fastener 210), and/or any other dimension of the structural component or detail of interest 201). Thus, the fatigue template generator 302 may create the fatigue template file prior to analysis by a finite element modeling and/or the finite element manager 306 using the finite element model input file (e.g., the FEM1 file) provided by a user. In the illustrated example, the fatigue template file provided by the fatigue template generator 302 may include information needed by the fatigue pre-processor 328 except for the stress values per unit load for each detail of interest. Instead, the fatigue template file includes placeholders for these stress values in the form of stress response IDs. For example, the placeholder values include values representative of reference stress (fief) and bearing stress (fbr) in the x-axis, y-axis and shear directions that will be calculated and output by the finite element manager 306. Additionally, the fatigue template file 302 of the illustrated example may also include DFR parameters independent of fatigue operating stresses, material type of each detail of interest, and identification numbers of spring elements, shell element properties and bar element properties of the details of interest and/or any other information needed for analysis of the details of interest. The fatigue template generator 302 communicates the fatigue template to the file manager 322.

The RcFactor determiner 304 obtains RcFactor values for each detail of interest. An RcFactor value is a scaling factor for fatigue capability of each detail that is dependent on the number of similar structural details (e.g., number of fasteners with the same diameter, number of shell elements with the same thickness, etc.). For example, fewer numbers of similar details provides a higher RcFactor. The RcFactor determiner 304 of the illustrated example retrieves the RcFactor values from the data storage 320 based on information provided by the user input interface 318. Additionally or alternatively, the RcFactor determiner 304 retrieves or obtains information from the finite element model input file (e.g., FEM1) via, for example, the file manager 322. In some examples, the user input interface 318 and/or the RcFactor determiner 304 determines groups of structurally similar geometries for each detail of interest having the same type of component attachments (i.e., chords-to-skin-to-frame attachment in the engine strut 202 of FIG. 2B). In some examples, the number of fasteners in each geometry group is determined. For example, a fastener group may be created based on a diameter of a fastener. The characteristic(s) of each group can be modified by a user. Based on the group characteristic(s) (e.g., the number of similar structural groups), the RcFactor determiner 304 retrieves the RcFactor value from a look-up table stored in, for example, the data storage 320. The RcFactor determiner 304 outputs an RcFactor file that may include, for example, names of each detail of interest, consistent with the unique naming convention assigned by the fatigue template generator 302, and RcFactor values associated with each detail of interest identified (e.g., in the geometry groups). The RcFactor determiner 304 communicates the RcFactor file to the file manager 322.

The input file builder 308 of the illustrated example, in general, prepares input files for analysis by the fatigue determiner 310. For example, the input file builder 308 of the illustrated example reads the finite element model user input file (e.g., FEM1), a modified model user input file (e.g., FEM 2, FEM3 and/or FEM4 described below in connection with FIGS. 11-19), the fatigue template file provided by the fatigue template generator 302, and the unit load stress values (e.g., the FEoutput, modified FEoutput' of FIG. 11) provided by the finite element manager 306. In the illustrated example, the input file builder 308 includes the pre-fatigue analyzer 324 and the post-fatigue analyzer 326.

The pre-fatigue analyzer 324 of the illustrated example, for example, modifies the fatigue template provided by the fatigue template generator 302. Specifically, the pre-fatigue analyzer 324 of the illustrated example receives and/or retrieves information in the fatigue template provided by the fatigue template generator 302 and/or the unit load stress data output (FEoutput, FEoutput') provided by the finite element modeling program. For example, the pre-fatigue analyzer 324 receives and/or retrieves the fatigue template file and/or the FEoutput file (or the FEoutput' file) from the fatigue template generator 302, the file manager 322, the finite element manager 306, and/or the data storage 320. In turn, the pre-fatigue analyzer 324 provides an input file (e.g., fref pre-processor input, fief pre-processor input') that replaces and/or correlates the reference stress response identification numbers in the fatigue template with the values of stress per unit load provided by the FEoutput file (or the FEoutput' file) for each detail of interest. Similarly, the pre-fatigue analyzer 324 provides an input file (e.g., fbr pre-processor input, fbr pre-processor input') that replaces and/or correlates the bearing stress identification numbers in the fatigue template with the bearing stress values per unit load provided by the FEoutput file (or the FEoutput' file) for each detail of interest. The pre-fatigue analyzer 324 may communicate the output file (e.g., fref pre-processor input file and fbr pre-processor input file, the fref pre-processor input' and fbr pre-processor input', etc.) to the file manager 322 and/or the fatigue determiner 310.

The post-fatigue analyzer 326 of the illustrated example, in general, reads the fatigue template, the unit load stress output (FEoutput file, FEoutput'), and the finite element model input file (e.g., FEM1, FEM2, FEM3, FEM4, etc.) and develops a fatigue parameter output file having fatigue parameter(s) that may be needed during and/or after analysis by the fatigue determiner 310 (e.g., the fatigue post-processor 332). For example, the fatigue parameters file may include parameter(s) needed to determine DFR values that are dependent on fatigue stress values, the ground-air-ground (GAG) damage ratio, etc. In some examples, the fatigue parameters file includes material type (e.g., of the frame 204, the chord 206 and/or the skin 208), fastener diameter values, plate thickness values, stack-up values over all joint plates, and/or associated identification numbers (e.g., placeholder values) of the shell and/or bar element property, and/or spring element identification (e.g., placeholder values) for each detail of interest that will be analyzed for fatigue by the fatigue determiner 310.

Once the input files (fref pre-processor input, fbr pre-processor input, fatigue parameters, fref pre-processor input', fbr pre-processor input') are provided by the input file builder 308 to the fatigue determiner 310, the fatigue determiner 310 conducts an analysis of the selected details of interest to determine fatigue margins for the structural component 211 such as, for example, the engine strut 202. More specifically, the fatigue determiner 310 determines fatigue margins at localized locations for each structural element or detail of interest selected for analysis. To determine the localized fatigue margins, the example fatigue determiner 310 of the illustrated example includes the fatigue pre-processor 328, the fatigue processor 330, and the fatigue post-processor 332.

The fatigue pre-processor 328 reads, receives and/or retrieves the pre-fatigue analysis input files from the input file builder 308 and user-specified identifications for flight operating load set stored in, for example, the data storage 320, the finite element input file (FEM1-4), the fatigue parameters file, etc. The flight operating load set, for example, may include a look-up table of parameter(s) such as, for example, load stress data over each flight segment (i.e., taxi, takeoff, ascent, descent, cruise, landing, etc.) that may be imparted to the structural detail during a flight envelope and/or flight cycles. In some examples, the fatigue pre-processor 328 prepares an input file for use by the fatigue determiner 310 to calculate the fatigue margins. More specifically, the fatigue pre-processor 328 converts the unit load reference stress data provided by the input file builder 308 (e.g., the fref and fbr pre-processor inputs, the modified fref and fbr pre-processor inputs') to operating load stress data based on stress values for flight condition(s) over each flight segment. In other words, the fatigue pre-processor 328 scales the unit load stress values (e.g., provided by the FEoutput or the FEouptut') based on the flight condition parameters and/or flight segment operating loads. The fatigue pre-processor 328, for example, prepares an input file (e.g., a fref fatigue input, a fref fatigue input') with this information for use by the fatigue processor 330 and/or the fatigue post-processor 332 when determining the fatigue margins. Similarly, the fatigue pre-processor 328 converts and/or scales the bearing stresses or loads imparted to the fastener(s) based on the flight parameter(s) and/or flight stresses and prepares an input file (e.g., fbr fatigue input, fbr fatigue input') for use to determine the fatigue margins. In the illustrated example, the example structural component 211 (e.g., the engine strut 202) of the illustrated example is a structure that has a linear response to stress or force and, therefore, the unit loads applied to a finite element model (e.g., the stress per unit load values in the FEoutput or the FEoutput') can be scaled linearly by the fatigue pre-processor 328 for the flight operating load conditions. However, in other examples, a structural component analyzed by the example fatigue analyzer system 330 may be a structure that has a non-linear response to stress or force, and the fatigue pre-processor 328 can scale the unit loads from a finite element model non-linearly.

The fatigue processor 330 then uses the input files generated by the fatigue pre-processor 328 (e.g., the fref fatigue input and the fbr fatigue input, or the fref fatigue input' and the fbr fatigue input') to calculate minimum and maximum fatigue operating stresses over each flight segment for each detail of interest or structural element of the structural component. The fatigue processor 330 also uses the information from the fatigue pre-processor 328 to determine a service goal (e.g., number of flights, years of operation, etc.) and/or calculate GAG damage ratio. The service goal, for example, may be a goal of providing a minimum amount of service years (e.g., between 20 and 30 years) of aircraft operation before initiation of detectable fatigue cracks. The GAG damage ratio is a ratio representing a fraction of fatigue damage caused by a ground-air-ground cycle that typically represents the largest stress excursion (min-to-max) per flight, which represents fatigue damage ratio representative of accumulated damage during each flight. The analysis provided by the fatigue processor 330 generates output files (e.g., fref fatigue output and fbr fatigue output, or fref fatigue output' and fbr fatigue output file') that can be used as input files for the fatigue post-processor 332. Although the fatigue processor 330 calculates fatigue margins, the fatigue margins determined by the fatigue processor 330 do not account for the DFR values that are dependent on the stress values provided by the flight operating loads.

The fatigue post-processor 332 determines the fatigue margins (e.g., at specific identified locations of the detail of interest). More specifically, the fatigue post-processor 332 receives and/or obtains the fref fatigue output and the fbr fatigue output (or the fref and fbr fatigue output') files from, for example, the fatigue processor 330 and/or the file manager 322. The fatigue post-processor 332 determines the biaxial case. For example, the biaxial case determines which stresses (e.g., the x-axis stress, the y-axis stress, the shear stress, etc.) are dominant. The fatigue post-processor 332 can then determine the DFR values that are dependent on the stress values (e.g., based on the flight conditions) provided by the fatigue processor 330. For example, the fatigue post-processor 332 uses the fatigue stress values, fatigue bearing stress values, biaxial case, RcFactor values contained in the RcFactor file, and other parameters contained in the fatigue parameter output file to determine or calculate unknown DFR parameters and uses the calculated DFR parameters to determine the DFR value. The fatigue post-processor 332 then determines a maximum allowable stress (Fmax) based on material constants, DFR value, minimum-to-maximum fatigue stress value, GAG damage ratio and/or the service life goal value for each detail of interest selected for analysis. The fatigue margins for each detail of interest are calculated, for example, using Equation 1 noted above.

The comparator 316 may compare the calculated maximum operating stresses and the fatigue allowable for each detail of interest selected for analysis to determine the fatigue margins at each detail of interest. The comparator 316 then communicates this information to the fatigue determiner 310, the file manager 322 and/or the fatigue post-processor 332, which determine or identify those detail(s) of interest that have a negative fatigue margin. The fatigue post-processor 332 provides an output file indicating the fatigue margins for all fatigue details selected for analysis (e.g., fatigue margins, fatigue margins'), an output file (e.g., shell property ID) having identification numbers representative of properties (e.g., thicknesses/gauges) for plate elements attached to fasteners at each detected negative fatigue margin location, and an output file (e.g., spring element ID) having identification numbers representative of fastener spring elements at negative fatigue margin locations. The fatigue post-processor 332, for example, communicates these files with the finite element model optimizer 312, the file manager 322 and/or the data storage 320.

If any fatigue margins are negative, manual adjustment of the dimensional characteristic(s) of the detail of interest may be made (e.g., increasing the thickness 216a-216c, increasing the diameter 218 of the fastener 210, etc.) and the details of interest having the modified dimensional characteristic(s) can be reprocessed or reanalyzed via the fatigue analyzer system 300.

Additionally, the example fatigue analyzer system 300 of FIG. 3 of the illustrated example includes a finite element model optimizer 312. However, in some examples, the fatigue analyzer system 300 does not include the finite element model optimizer 312. In general, the example optimizer 312 automatically corrects the negative fatigue margins identified during the fatigue analysis process provided by the fatigue determiner 310. Specifically, the example optimizer 312 corrects the detected negative fatigue margins with minimal impact to structural weight of the structural component while maintaining positive fatigue margins at the other analyzed details of interest whose fatigue margins are expected to change due to load redistribution. For example, the optimizer 312 changes or modifies a dimensional characteristic(s) (e.g., increases a thickness, a shell thickness, a stack-up thickness, etc.) for each detail of interest identified as having a negative fatigue margin and provides the modified dimensional characteristic(s) to the fatigue determiner 310, the fatigue template generator 302, the RcFactor determiner 304, the finite element manager 306, and/or the input file builder 308 to recalculate the fatigue margins. The optimizer 312 of the illustrated example conducts an iterative process until all of the fatigue margins have positive values. In the illustrated example, the optimizer 312 increases a dimensional characteristic locally (e.g., localized gauging-up) at negative margin locations, not a dimensional characteristic(s) over the entirety of the entire structural component. As a result of increasing a local thickness or dimensional characteristic(s) (e.g., local gauging up), a minimum amount of weight is added to the structural element of interest and, thus, the structural component. In some examples, even if all of the fatigue margins result in positive values after an initial analysis by the fatigue determiner 310, the example optimizer 312 of the illustrated example automatically analyzes the structural component and/or the details of interest to determine if a weight or mass (e.g., via changing a dimensional characteristic(s)) of the structural component or detail(s) of interest can be reduced while still providing positive margins. For example, the optimizer 312 of the illustrated example optimizes a structural component with positive margins to a lowest weight possible prior to detecting negative margins.

To optimize a dimensional characteristic(s) and remove a negative fatigue margin (and/or reduce a positive fatigue margin) at a detail of interest, the example optimizer 312 determines a sum of masses of identified details of interest. The optimizer 312 instructs the fatigue determiner 310, the input file builder 308, the finite element manager 306, the RcFactor determiner 304 and/or the fatigue template generator 302 to repeat the methods noted above to determine the fatigue margins and mass using an iterative process until convergence is achieved. For example, convergence is achieved when a minimum amount of mass has been added such that all fatigue margins of a structural component yield positive margins across all structural elements or details of interest. For example, if a single detail of interest analyzed by the fatigue determiner 310 results in a negative fatigue margin, the optimizer 312 of the illustrated example automatically corrects the negative margin value by increasing or otherwise changing a characteristic(s) of the detail of interest having the negative fatigue margin result (e.g., a shell thickness of an element, the joint 212, 214, a diameter 218 of the fastener 210, etc.). The optimizer 312 then reanalyzes the detail of interest with the modified characteristic(s) via the fatigue determiner 310 until a minimum amount of mass has been added such that the detail of interest has a positive fatigue margin while maintaining positive fatigue margins for all other fatigue details of interest(s). In some examples, the optimizer 312 changes a characteristic(s) (e.g., a dimensional characteristic, a material characteristic, etc.) of a detail of interest having a positive margin to reduce the weight of the structural component so long as the change in the characteristic(s) does not result in a negative fatigue margin at that detail of interest. As a result, the structural component is modified with a minimum weight addition due to local gauging up of the detail of interest identified with the negative fatigue margin.

In the illustrated example, the optimizer 312 receives, obtains, retrieves and/or reads the shell property ID file provided by the fatigue determiner 310. In particular, the optimizer 312 provides an output file (e.g., a response mass ID) with identification numbers of a mass response that sums the mass of the properties from the shell property ID file. The optimizer 312 also updates the finite element model input file (e.g., and saves it as FEM2) to calculate and output design responses that sum the mass of the shell element thickness properties at the negative margin locations determined by the fatigue determiner 310. The optimizer 312 of the illustrated example updates the modified finite element model input file (FEM2 file) with new gauges assigned to the shell element properties based on current design variables values within the optimization and saves this modified input file (e.g., as FEM3). For example, the optimization parameters may be provided by the user input interface 318 and/or may be retrieved by the file manager 322 and/or from the data storage 320. Based on the updated shell element gauges provided in the modified finite element model input file (FEM3), the optimizer 312 receives the spring element ID file from the fatigue determiner 310 and/or the file manager 322 and updates the spring elements to reference new stiffness properties based on current thicknesses or gauges of the shell elements identified in the FEM3 file. The optimizer 312 provides these updated shell element gauges and the spring element values via an output file (e.g., the FEM4 file). In other words, the FEM4 file is the FEM3 file, but updated with spring elements referencing new stiffness properties based on current design variable values within the optimization and/or the FEM3 file.

The optimizer 312 then instructs the finite element manager 306 to provide a finite element model output based on the FEM4 file instead of the FEM1 file as the input file. The process described above in connection with the finite element manager 306 is the same except for the values in the FEM4 file and, thus, for brevity, the process performed by the finite element manager 306 is not repeated herein. Thus, an output file (e.g., FEoutput') provided by the finite element manager 306 is similar to the output file (e.g., FEoutput) noted above except the values of the FEoutput' file are based on the FEM4 input file rather than the FEM1 input file. The optimizer 312 also instructs the input file builder 308 to provide reference stress values (a fref pre-processor input'), bearing stress values (e.g., a fbr pre-processor input') and the fatigue parameters for use with the fatigue determiner 310 based on the FEM4 file, the FEoutput' and the fatigue template generated by the fatigue template generator 302. In some examples, the optimizer 312 instructs the RcFactor Determiner 304 to output an updated RcFactors file based on the FEM4 file for use with the fatigue determiner 310.

The fatigue determiner 310 receives and/or obtains the fref pre-processor input', fbr pre-processor input', RcFactor values, and fatigue parameters to calculate the fatigue margins based on the FEM4 input file and the FEoutput' file values. For example, the fatigue pre-processor 328 analyzes the fref pre-processor input' and fbr pre-processor input' files and generates a reference stress fatigue input file (e.g., fref fatigue input') and a bearing stress fatigue input file (e.g., fbr fatigue input') similarly as discussed above. The fatigue processor 330 receives the fref fatigue input' and the fbr fatigue input' files and generates a reference stress fatigue output (e.g., fref fatigue output') and a bearing stress fatigue output file (e.g., fbr fatigue output'). The fatigue post-processor 332 receives the fref fatigue output', the fbr fatigue output', the fatigue parameters file, and the RcFactors file, and determines and/or recalculates the fatigue margins based on the modified dimensional characteristics. For example, the fatigue determiner 310 provides an updated fatigue margins file (e.g., fatigue margins'). The optimizer 312 analyzes the updated fatigue margins file. The optimizer 312 performs an iterative process by continuing to modify dimensional characteristic(s) of the details of interest having negative fatigue margins until all negative fatigue margins are eliminated from all structural details of interest and/or a weight of the structural component is reduced to a lowest weight possible while all fatigue margins of the detail of interests remain positive. For example, the optimizer 312 performs an iterative process until all fatigue margins are positive and mass has been minimized and/or optimization convergence criteria (e.g., design objectives, optimization design variables) have been met. In some examples, convergence is met when the mass of the structure has changed minimally (e.g., between zero and one percent) between consecutive (e.g., two consecutive) iterations.

While an example manner of implementing the example fatigue analyzer 300 is illustrated in FIG. 3, one or more of the elements, processes and/or devices illustrated in FIG. 3 may be combined, divided, re-arranged, omitted, eliminated and/or implemented in any other way. Further, the example fatigue template generator 302, the example RcFactor determiner 304, the example finite element analyzer 306, the example input file builder 308, the example fatigue determiner 310, the example finite element model optimizer 312, the example input/output 314, the example comparator 316, the example user input interface 318, the example reference data storage 320, the example file manager 322, the example pre-fatigue analyzer 324, the example post-fatigue analyzer 326, the example fatigue pre-processor 328, the example fatigue processor 330, and example the fatigue post-processor 332 and/or, more generally, the example fatigue analyzer 300 of FIG. 3 may be implemented by hardware, software, firmware and/or any combination of hardware, software and/or firmware. Thus, for example, any of the example fatigue template generator 302, the example RcFactor determiner 304, the example finite element analyzer 306, the example input file builder 308, the example fatigue determiner 310, the example finite element model optimizer 312, the example input/output 314, the example comparator 316, the example user input interface 318, the example reference data storage 320, the example file manager 322, the example pre-fatigue analyzer 324, the example post-fatigue analyzer 326, the example fatigue pre-processor 328, the example fatigue processor 330, and the example fatigue post-processor 332 and/or, more generally, the example fatigue analyzer 300 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the example fatigue template generator 302, the example RcFactor determiner 304, the example finite element analyzer 306, the example input file builder 308, the example fatigue determiner 310, the example finite element model optimizer 312, the example input/output 314, the example comparator 316, the example user input interface 318, the example reference data storage 320, the example file manager 322, the example pre-fatigue analyzer 324, the example post-fatigue analyzer 326, the example fatigue pre-processor 328, the example fatigue processor 330, and the example fatigue post-processor 332 of FIG. 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example fatigue analyzer 300 of FIG. 3 may include one or more elements, processes and/or devices in addition to, or instead of, those illustrated in FIG. 3, and/or may include more than one of any or all of the illustrated elements, processes and devices.

FIGS. 4-19 are flowcharts of example methods 400-1900 that may be used to implement the example fatigue analyzer system 300 of FIG. 3. For example, the method depicted in the flowcharts 400-1900 of FIGS. 4-19 may be implemented using machine readable instructions. The machine readable instructions may comprise a program for execution by a processor such as the processor 2012 shown in the example processor platform 2000 discussed below in connection with FIG. 20. The program may be embodied in software stored on a tangible computer readable storage medium such as a CD-ROM, a floppy disk, a hard drive, a digital versatile disk (DVD), a Blu-ray disk, or a memory associated with the processor 2012, but the entire program and/or parts thereof could alternatively be executed by a device other than the processor 2012 and/or embodied in firmware or dedicated hardware. Further, although the example programs are described with reference to the flowcharts illustrated in FIGS. 4-19, many other methods of implementing the example fatigue analyzer system 300 may alternatively be used. For example, the order of execution of the blocks may be changed, and/or some of the blocks described may be changed, eliminated, or combined.

As mentioned above, the example methods 400-1900 of FIGS. 4-19 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example methods of FIGS. 4-19 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Figure 4:
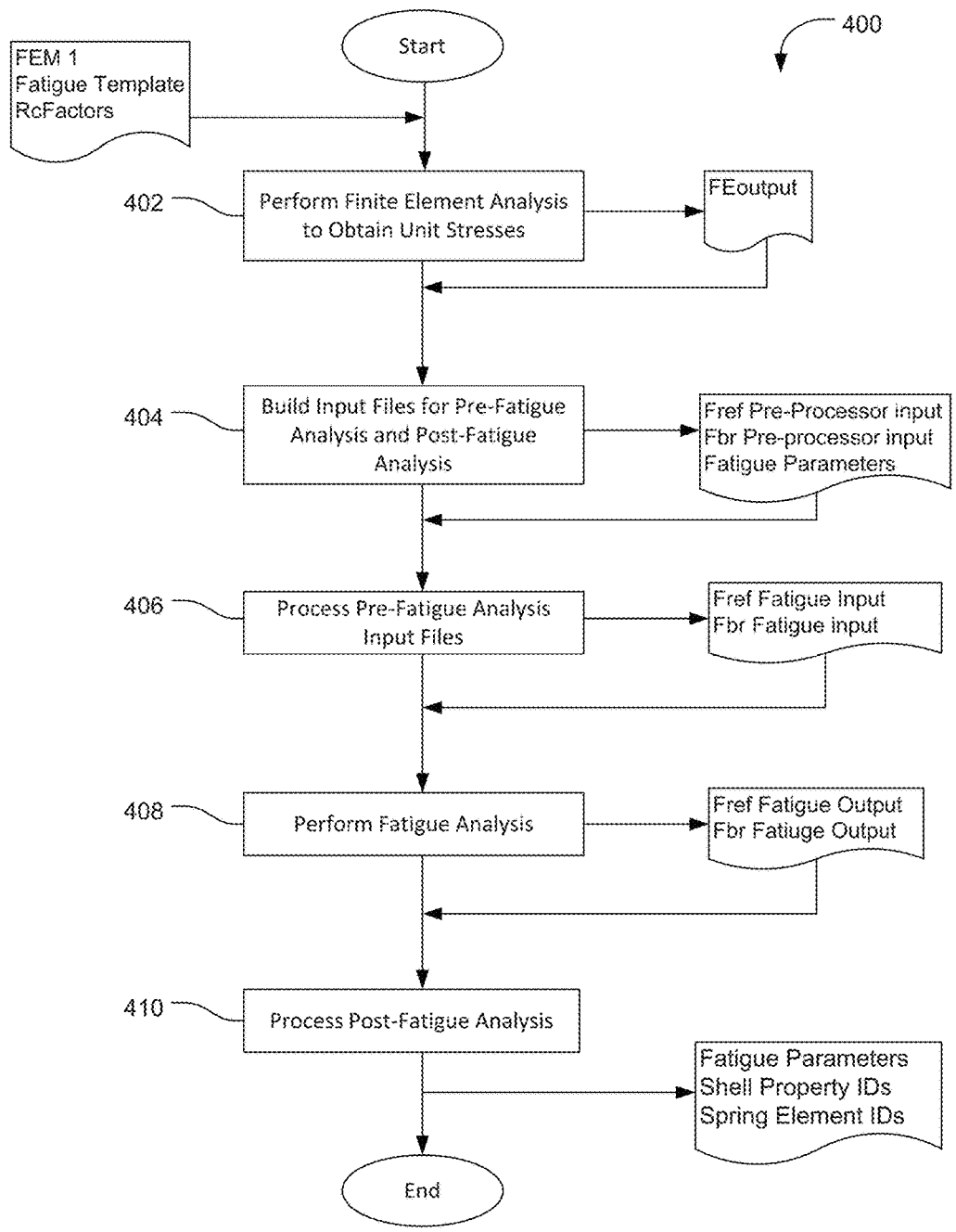
FIGS. 4-19 are example flowcharts representative of example methods that may be used to implement the example fatigue analyzer system of FIG. 3.

FIG. 4 is a flowchart representative of a method 400 for providing a fatigue analysis of a structural element or detail of interest. At block 402, a finite element model analysis of the structural detail of interest is performed to obtain stress values per unit load (e.g., a unit caseload). For example, the file manager 322 may retrieve this information from an output file (e.g., FE output) provided by a finite element analysis program that is based on the finite element model input file (e.g., FEM1). In some examples, the file manager 322 may retrieve the output file from a finite element analysis program performing the modeling analysis on a system or computer remotely located from the finite element manager 306 and/or the fatigue analyzer system 300.

The input file builder 308 prepares input files for the pre-fatigue analysis and post-fatigue analysis (block 404). For example, the input file builder 308, the pre-fatigue analyzer 324, and/or the post-fatigue analyzer 326 receive and/or obtain the unit stress values (e.g., from the FE output) and/or the fatigue template for details of interest from, for example, the file manager 322. The input file builder 308, the pre-fatigue analyzer 324, and/or the post-fatigue analyzer 326 of the illustrated example prepare output files for use by the fatigue determiner 310 as input files. The files include, for example, a reference stress pre-processor input file (e.g., the fref pre-processor input), a bearing pre-processor input file (e.g., fbr pre-processor input), and a fatigue parameter(s) file. These files are discussed in greater detail in connection with the method 500 of FIG. 5.

The fatigue determiner 310 and/or the fatigue pre-processor 328 conduct a pre-fatigue analysis (block 406). For example, the fatigue determiner 310 and/or the fatigue pre-processor 328 receives the reference stress pre-processor input file and the bearing stress pre-processor input file from the input file builder 308 and/or the file manager 322. As a result of the pre-fatigue analysis at block 406, a reference stress fatigue input file (fref fatigue input) and a bearing stress fatigue input file (fbr fatigue input) are created by the fatigue determiner 310 and/or the fatigue pre-processor 328.

The fatigue determiner 310 then performs a fatigue analysis (block 408). For example, the fatigue determiner 310 and/or the fatigue processor 330 receives the reference stress fatigue input file and the bearing fatigue input file from, for example, the fatigue pre-processor 328. The fatigue processor 330 processes the information provided in the input files and generates a reference fatigue output file (fref fatigue output) and a bearing fatigue output file (e.g., fbr fatigue output). In some examples, the fatigue processor 330 communicates the output files to the file manager 322.

A post-fatigue analysis is then performed by the fatigue post-processor 332 (block 410). For example, the fatigue determiner 310 and/or the fatigue post-processor 332 receives and/or retrieves the reference stress fatigue output file (fref fatigue output), the bearing stress fatigue output file (fbr fatigue output), the fatigue parameter(s) file, and the RcFactor file from, for example, the file manager 322 and/or respective ones of the fatigue determiner 310, the input file builder 308, the RcFactor determiner 304 and/or the fatigue analyzer system 300. The fatigue post-processor 328, for example, processes the information in the received or retrieved files and calculates fatigue margins for each structural detail of interest. In some examples, the fatigue post-processor 332 outputs the fatigue margins (e.g., a fatigue margins file) and corresponding shell property identifications (e.g., shell property ID) and spring element identifications (spring IDs) for each detail of interest.

Figure 5:
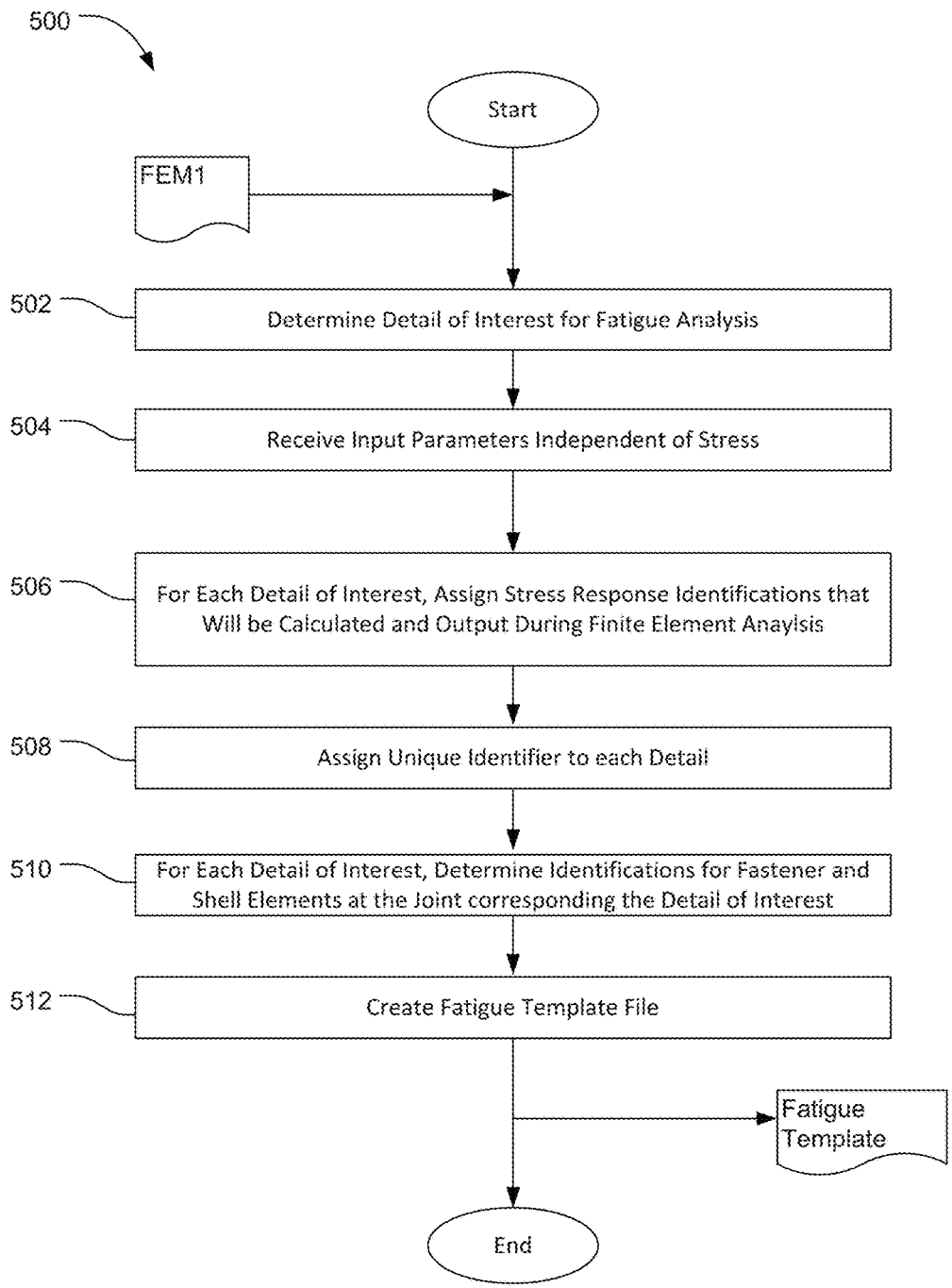

FIG. 5 illustrates a flowchart of an example method 500 that may be used to implement the example fatigue template generator 302 of the example fatigue analyzer system 300 of FIG. 3. At block 502, the fatigue template generator 302 retrieves, obtains or determines selected details of interest for fatigue analysis (block 502). For example, the fatigue template generator 302 obtains or retrieves the selected details of interest for analysis from the finite element model input file (e.g., FEM1) provided to the file manager 322 and/or the user input interface 318. In addition, for each selected detail of interest, the fatigue template generator 302 receives and/or obtains other information such as input parameters independent of stress from the finite element model input file (FEM1) (block 504). The fatigue template generator 302, for each detail of interest, assigns and/or populates stress response identifications as placeholders for stress values that will be calculated and/or output during the finite element analysis performed by the fatigue determiner 310 (block 506). The fatigue template generator 302 assigns unique identifiers to each detail of interest (block 508). Additionally, the fatigue template generator 302 of the illustrated example, for each detail of interest, determines identifications for each fastener, bar element and/or shell element (e.g., at the joint 212 or 214) corresponding to each detail of interest (block 510). Based on the information received from the finite element model input file (FEM1), the fatigue template generator 302 creates or populates a fatigue template file (block 512). For example, the fatigue template file may be an array that includes, but is not limited to, detail fatigue rating parameters independent of stress, material type(s) and/or characteristic(s) of the selected details of interest, reference stress response identification(s) (e.g., placeholder values) for stresses to be calculated in the x, y, and shear direction, bearing stress identification(s) (e.g., placeholder values) for bearing stresses to be calculated in the x, y, and shear direction, unique name identifier for each details of interest based on, for example, collector ID, node ID, and/or stress components (x-axis, y-axis, shear, etc.), spring element identification(s) and/or bar element property identification(s) (e.g., placeholder values) for fastener(s) of each selected details of interest, shell element property identification(s) (e.g., place holder values representative of thickness, gauges, etc.) for each plate element at a joint within the selected details of interest, loading type (e.g., axial, shear, etc.), etc.

Figure 6:
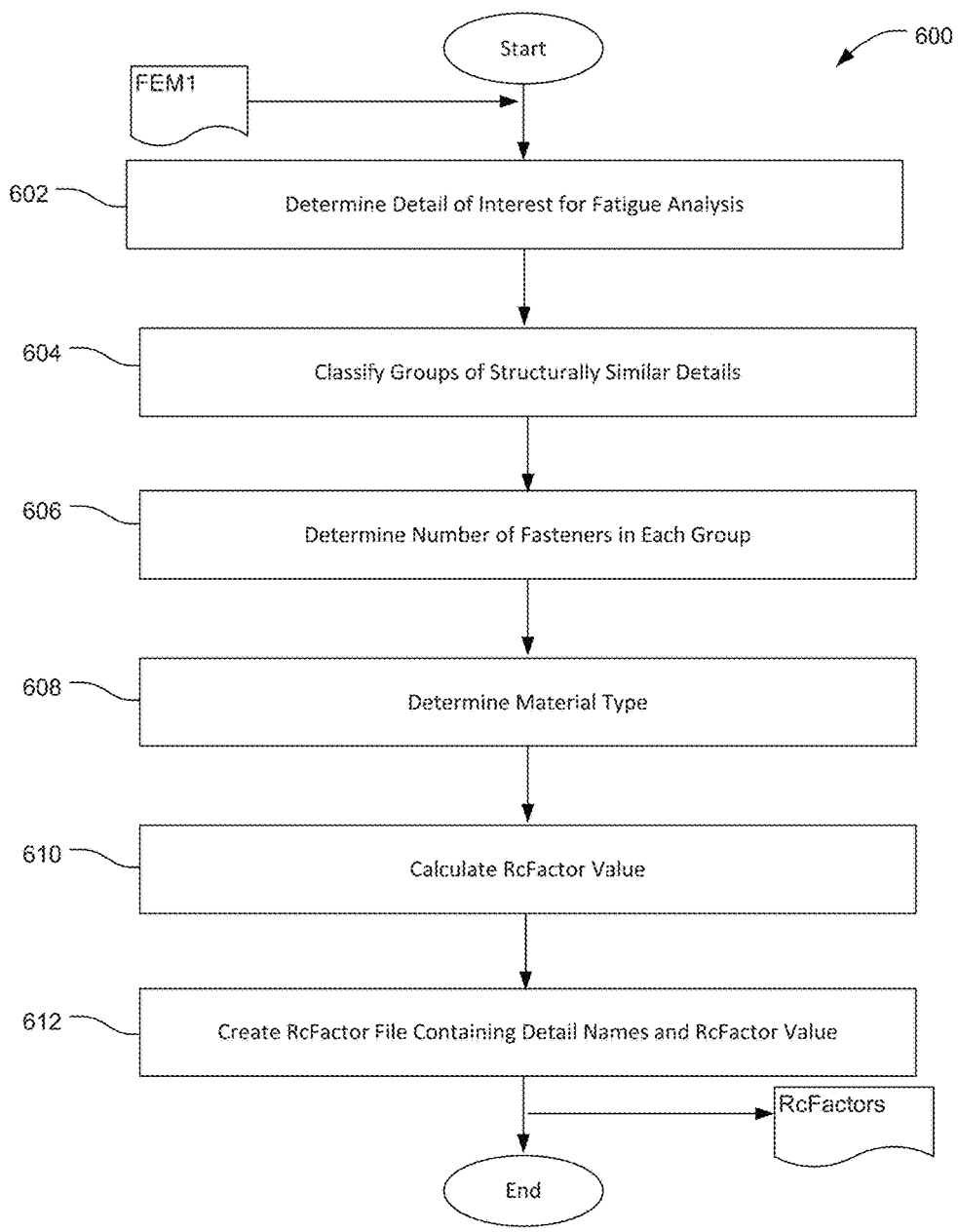

FIG. 6 illustrates a flowchart of an example method 600 that may be used to implement the example RcFactor determiner 304 of the example fatigue analyzer system 300 of FIG. 3. The RcFactor determiner 304 retrieves, obtains or determines the details of interest selected for analysis (block 602). For example, the RcFactor determiner 304 may retrieve the information from the finite element model input file (FEM1) provided by the file manager 322. The RcFactor determiner 304 classifies groups of structurally similar details of interest (block 604). For example, the RcFactor determiner 304 obtains from the user input interface 318 and/or the file manager 322 user defined groups of details of interest having similar geometrical profiles or shapes and/or the same type of component attachments (e.g., chords-to-skins-to-frames in an engine strut). The RcFactor determiner 304 determines the number of fasteners (e.g., hi-lock fasteners) in each classified group (block 606). In some examples, the fasteners are grouped or classified by fastener diameter. The group can be modified by a user to change which fasteners are in each group. The RcFactor determiner 304 identifies the material type for each detail (block 608). For example, the material type may be identified based on a density value of an associated material card for a plate element in the selected detail. The material type may be retrieved from a look-up table stored in the data storage 320. The RcFactor determiner 304 calculates the RcFactor value (block 610). For example, the RcFactor determiner 304 determines or calculates the RcFactor value for each detail as a function of the number of fasteners in each fastener group and/or the plate material type at each joint (e.g., the joint 212, 214). For example, the RcFactor values may be obtained via a look-up table stored in, for example, the data storage 320. The RcFactor determiner 304 creates an RcFactor file containing detail names, consistent with the unique naming convention assigned by the fatigue template generator 302, and the RcFactor for each detail contained in the user-defined geometry group (block 612).

Figure 7:
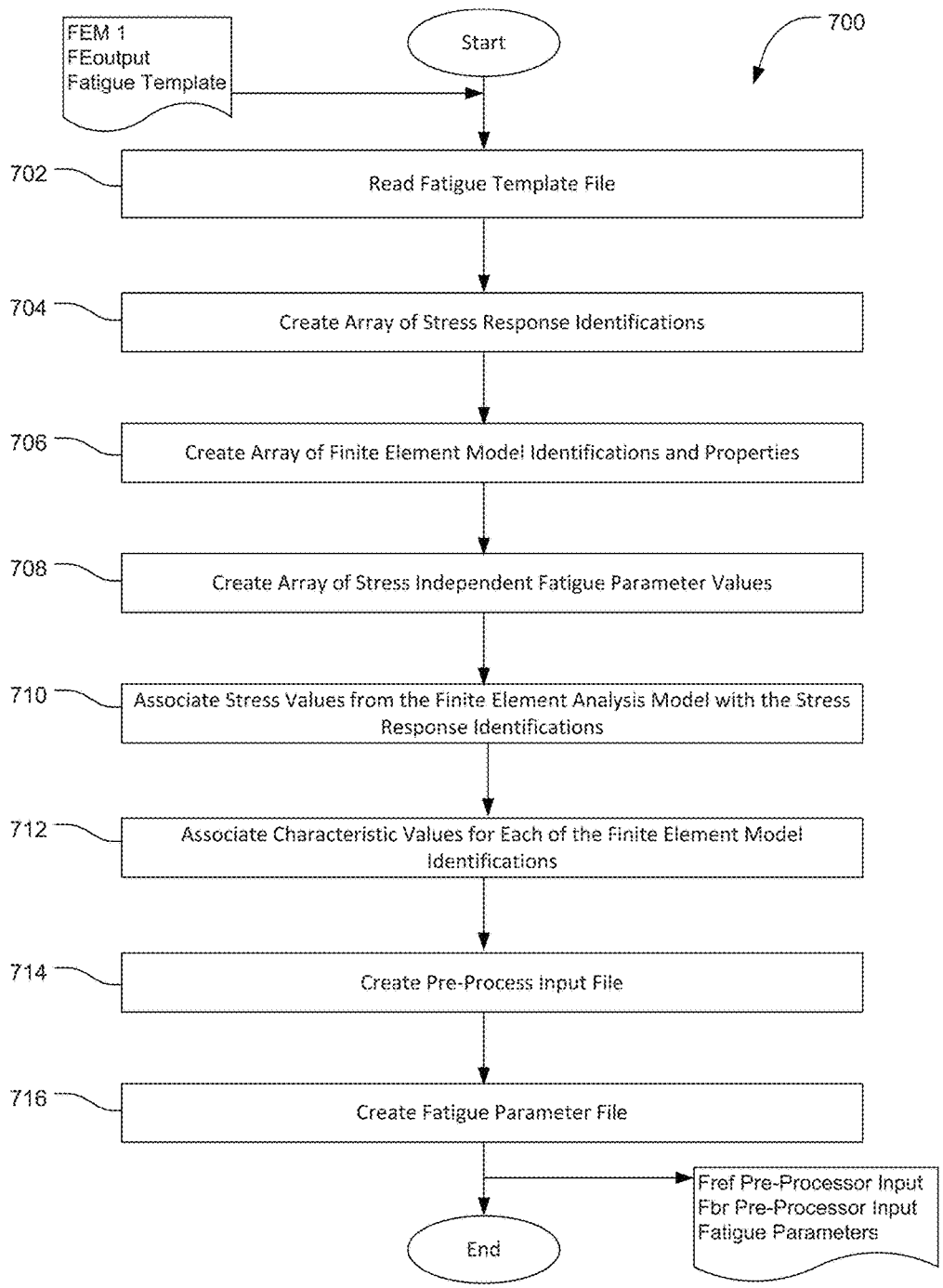

FIG. 7 illustrates is a flowchart of an example method 700 that may be used to implement the example block 404 of the example method 400 of FIG. 4 and/or the input file builder 308 of the example fatigue analyzer system 300 of FIG. 3. The input file builder 308 and/or the pre-fatigue analyzer 324 of the illustrated example read the fatigue template file generated by the fatigue template generator 302 (block 702). The input file builder 308 and/or the pre-fatigue analyzer 324 create an array of stress response identification(s) for each detail of interest (block 704). For example, each array of stress response identifications include at least one of a reference stress identification and a bearing stress identification for each detail of interest selected (e.g. fref stress value and fbr stress value). The input file builder 308 and/or the pre-fatigue analyzer 324 of the illustrated example also creates an array of finite element model identifications for each spring element (e.g., for each fastener of the selected detail of interest) and finite element properties corresponding to, for example, fastener diameter, plate thickness, and/or stack-up thickness for each detail (block 706). The input file builder 308 and/or the pre-fatigue analyzer 324 of the illustrated example also create an array of stress independent fatigue parameter values (e.g., DFR stress-independent values) for each detail of interest (block 708).

The input file builder 308 and/or the post-fatigue analyzer 326 associates the unit load stress values from the unit stress output file (FE output) with the stress response identifications provided by the pre-fatigue analyzer 324 (block 710). The input file builder 308 and/or the post-fatigue analyzer 326 of the illustrated example associates characteristic values for each of the finite element model identifications assigned by the pre-fatigue analyzer 324 (block 712). For example, the characteristics may include, but are not limited to, the diameter of each fastener, plate thickness values, stack-up thickness values, etc. The input file builder 308 and/or the post-fatigue analyzer 326 create pre-process input files (e.g., reference stress pre-processor input and bearing stress pre-processor input files) (block 714). The input file builder 308 and/or the post-fatigue analyzer 326 also create a fatigue parameter file (block 716).

Figure 8:
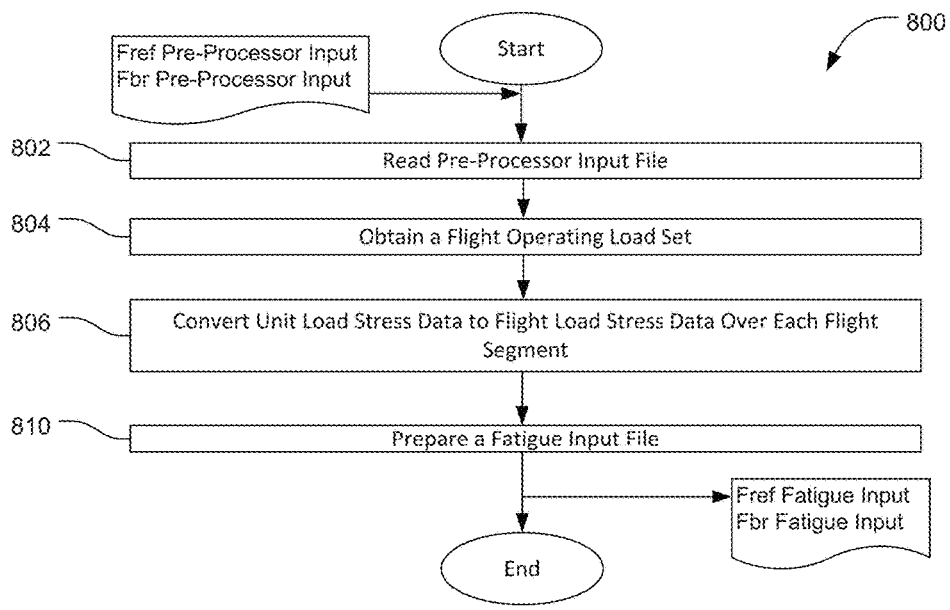

FIG. 8 illustrates a flowchart of an example method 800 that may be used to implement the example block 406 of the example method 400 of FIG. 4 and/or the example fatigue pre-processor 328 and/or the example fatigue determiner 310 of the example fatigue analyzer 300 of FIG. 3. The example fatigue determiner 310 and/or the example fatigue pre-processor 328 reads the pre-processor input file (e.g., fref pre-processor input and fbr pre-processor input) provided by the input file builder 308 (block 802). The example fatigue determiner 310 and/or the example fatigue pre-processor 328 obtain a flight operating load set (block 804). For example, the flight operating load set may be stored in the data storage 320. In some examples, the flight operating load set includes flight stress data over each flight segment of a flight envelope (e.g., taxing, takeoff, landing, cruise, maneuvering, etc.). The example fatigue determiner 310 and/or the example fatigue pre-processor 328 converts the unit load stress data to the flight load stress data over each flight segment (block 806). The example fatigue determiner 310 and/or the example fatigue pre-processor 328 prepare a fatigue input file (e.g., fref fatigue input and fbr fatigue input) for use by the fatigue processor 330 (block 810).

Figure 9:
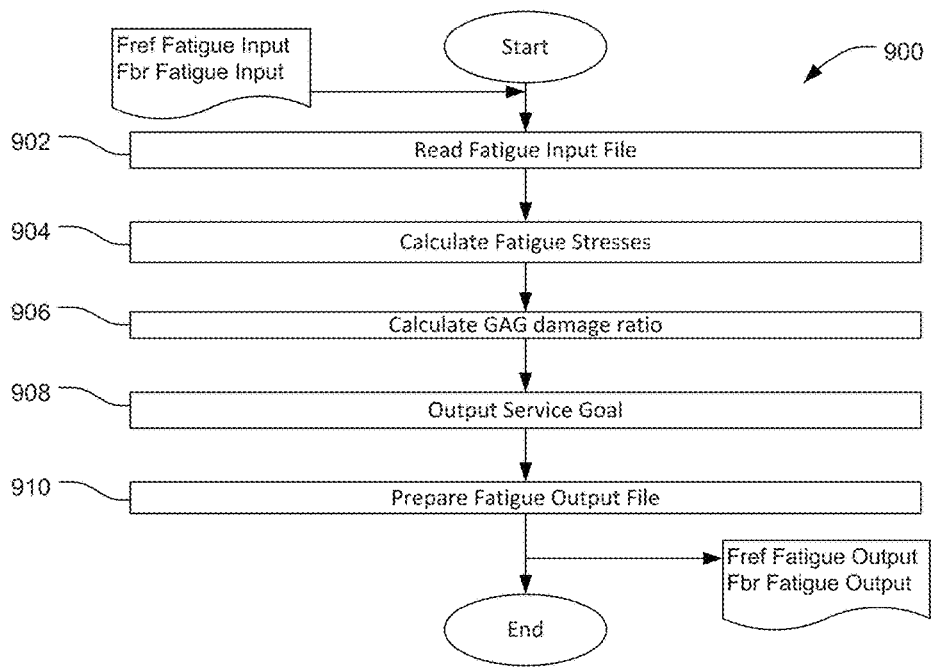

FIG. 9 illustrates an example flowchart of an example method 900 that may be used to implement the example block 408 of the example method 400 of FIG. 4 and/or the example fatigue processor 330 and/or the example fatigue determiner 310 of the example fatigue analyzer 300 of FIG. 3. The example fatigue determiner 310 and/or the example fatigue processor 330 reads the fatigue input file (e.g., fref fatigue input and fbr fatigue input) provided by the fatigue pre-processor 328 (block 902). The example fatigue determiner 310 and/or the example fatigue processor 330 calculate fatigue stresses (block 904). For example, the fatigue stresses include minimum and maximum fatigue operating stresses over each flight segment for each detail of interest. The example fatigue determiner 310 and/or the example fatigue processor 330 also calculate a GAG damage ratio (block 906) and outputs a service goal (e.g., the number of flights and/or years of service) (block 908). The example fatigue determiner 310 and/or the example fatigue processor 330 prepare a fatigue output file (block 910). For example, the fatigue output file includes the fatigue stress values, the GAG damage ratio value and the service goal value. The example fatigue output file of the illustrated example may include a reference stress fatigue output file (fref fatigue output) and a bearing stress fatigue output file (fbr fatigue output).

Figure 10:
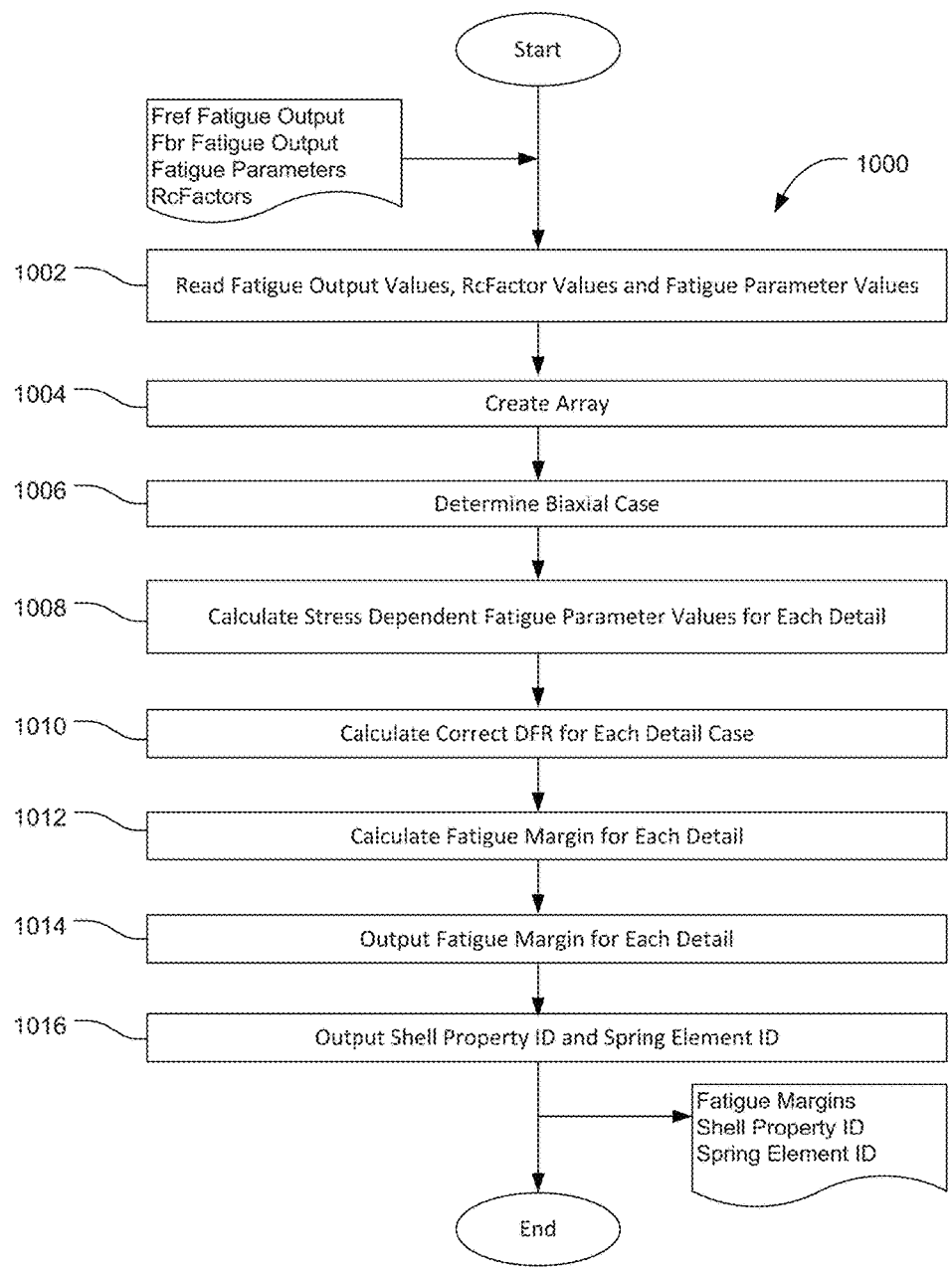

FIG. 10 illustrates a flowchart of an example method 1000 that may be used to implement the example block 410 of the example method 400 of FIG. 4, the example fatigue post-processor 332 and/or the example fatigue determiner 310 of the example fatigue analyzer 300 of FIG. 3. The example fatigue post-processor 332 and/or the example fatigue determiner 310 of the illustrated example reads, obtains and/or retrieves the fatigue output values, RcFactor values and the fatigue parameter values (block 1002). For example, the fatigue post-processor 332 reads the reference stress fatigue output file (fref fatigue output) and the bearing stress fatigue output file (fbr fatigue output) provided by the fatigue processor 330, the RcFactor values provided by the RcFactor determiner 304, and the fatigue parameter values provided by the input file builder 308. For example, the fatigue post-processor 332 reads, obtains and/or retrieves the minimum and maximum fatigue stresses, GAG damage ratio value, service goal for critical flight segment of each detail, material constants for each detail (e.g., via a look-up table and/or the input file builder 308), fastener diameter, plate thickness, stack-up thickness, and/or information from the user input interface 318, etc.

The example fatigue post-processor 332 and/or the example fatigue determiner 310 uses the information provided at block 902 to create an array (block 1004). The array, for example, includes information including, but not limited to, RcFactors for each detail, stress independent fatigue parameter values, finite element model identification numbers for shell and bar element properties and spring elements, finite element model identification numbers for fastener diameter, plate thickness, and stack-up thickness for each detail, etc. The example fatigue post-processor 332 also obtains and/or retrieves the operating fatigue stresses and determines the biaxial case (block 1006). The example fatigue post-processor 332 then calculates the stress dependent fatigue parameter values for each detail of interest (block 1008). With the biaxial case and the stress dependent fatigue parameter values known or determined, the example fatigue post-processor 332 calculates the correct DFR for each detail of interest (block 1010). For example, the example fatigue post-processor 332 determines the DFR using both stress-dependent and stress-independent fatigue parameters, the RcFactors, and the biaxial case. Once the DFR value is calculated, the fatigue margin for each detail of interest is calculated (block 1012). For example, the fatigue margin for each detail of interest may be calculated using the maximum stress values determined by the fatigue post-processor 332 and the fatigue allowables obtained by the DFR determined from stress-dependent values and stress-independent values, fatigue stresses, material constants, the biaxial case, etc.

The example fatigue post-processor 332 and/or the example fatigue determiner 310 provides an output file with the fatigue margins for each detail of interest (block 1014). Additionally, the example fatigue post-processor 332 and/or the example fatigue determiner 310 provide or output a shell property identification file and a spring element identification file for each detail of interest (block 1016). For example, the shell property identification file includes identification numbers of properties (e.g., thickness/gauges) for plate elements attached at a joint (e.g., joint 212 or 214) and the spring element identification file includes identification numbers of fastener spring elements attaching the plate elements at the detail of interest. In some examples, the example shell property identification and the spring element identification files are provided for detected negative margins of interest.

Figure 11:
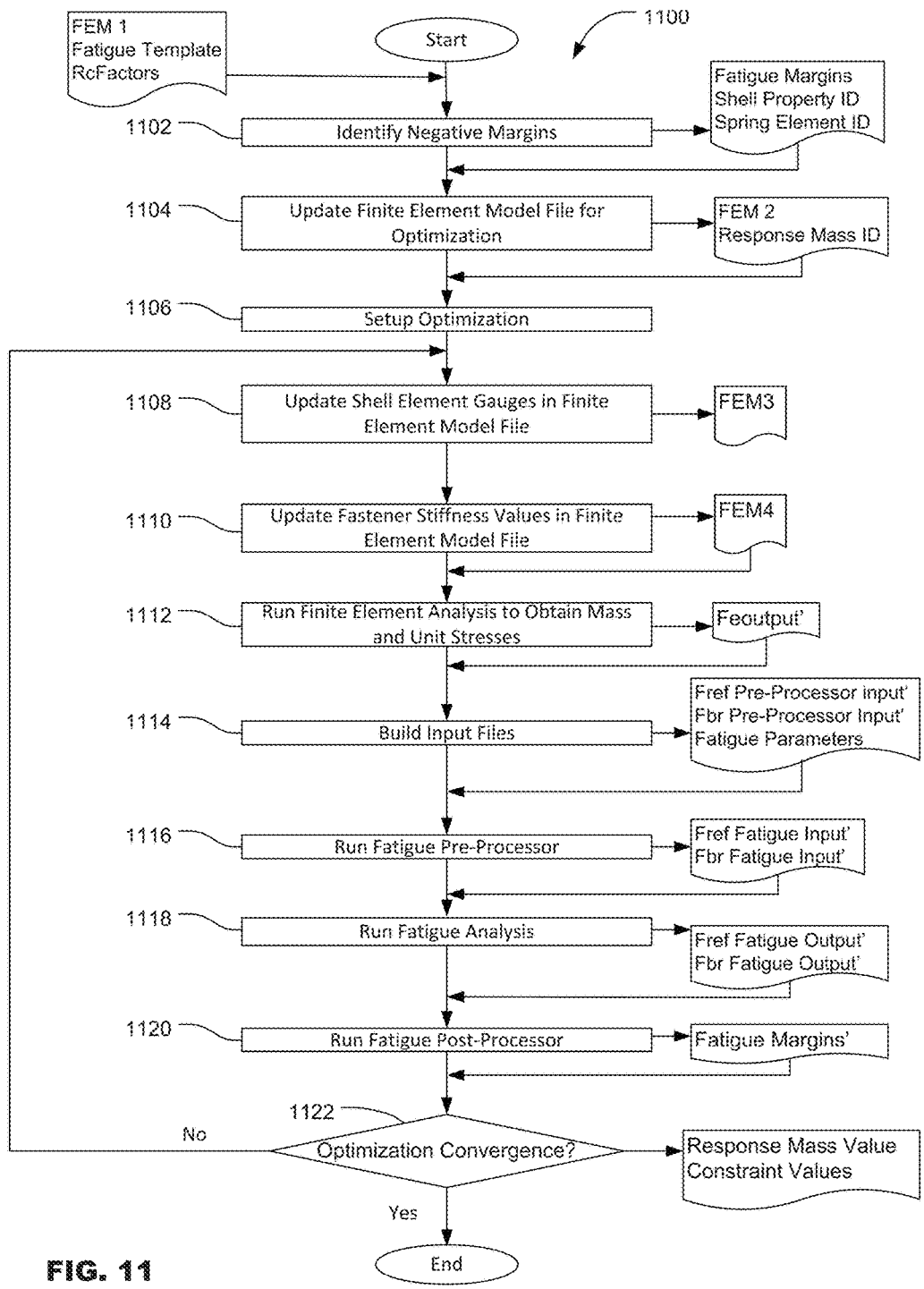

FIG. 11 illustrates a flowchart of an example method 1100 that may be used to implement the example finite element model optimizer 312 of the example fatigue analyzer 300 of FIG. 3. In the illustrated example, the method 1100 represents an optimization process performed automatically to correct negative fatigue margins of a detail of interest identified by, for example, the fatigue determiner 310. In general, the example method 1100 of the illustrated example corrects the identified negative fatigue margins to be positive fatigue margins with a minimum amount of weight addition via, for example, local gauge-up, while maintaining positive fatigue margins for all other details of interest analyzed by the fatigue determiner 310. In some examples, the example method 1100 and/or the optimizer 312 may be employed to minimize a mass or weight of a structural component or detail of interest even when the initial fatigue margins of all details of interest are positive. In some such examples, the example method 1100 and/or the optimizer 312 may optimize a structural component and/or detail of interest to have the smallest dimensional value while having a positive fatigue margin for all locations or details of interest.

The example method 1100 of the illustrated example identifies negative fatigue margins (block 1102). For example, to determine the negative fatigue margins, the fatigue analysis system 300 performs the methods 400-1000 of FIGS. 4-10. Thus, block 1102 is generally representative of the methods 400-1000 of FIGS. 4-10. In some examples, the optimizer 312 of the illustrated example reads, retrieves and/or obtains the fatigue margins provided in the fatigue margins output file provided by the fatigue determiner 310. The optimizer 312 may employ the comparator 316 to compare each detail of interest to a pre-set characteristic (e.g., zero or a positive value) to determine which fatigue margins are negative. The optimizer 312, in some examples, may identify a shell ID, a spring element ID, a stress response ID and/or a bearing stress ID associated with the detail of interest determined to have a negative fatigue margin.

The optimizer 312 updates the finite element model file (e.g., the user input file FEM1) for optimization (block 1104). For example, the optimizer 312 creates a design response identification and modifies the finite element model input file to output and/or print the design response identification. The response identification, for example, may include a sum of the mass of all shell property IDs at negative fatigue margin locations identified in the finite element model input file (e.g., FEM1). In the illustrated example, the optimizer 312, for example, receives the finite element model input file (e.g., FEM1) and the shell property ID and provides an updated finite element model input file (e.g., FEM2) and a Response mass ID file as set forth in greater detail below in connection with FIG. 12. For example, the optimizer 312 calculates and outputs a design response that sums the mass of shell element thickness properties at negative fatigue margin locations (e.g., Response Mass ID).

The optimizer 312 sets up the optimization (block 1106). For example, the optimization may include design variables (e.g., identified properties), defined constraints (e.g., fatigue margins), defined objective (e.g., minimize response mass), and/or selection of an optimization algorithm. For example, the design variables may include an allowable range that a thickness of a shell element may be modified by the optimizer 312 and/or any other desired boundaries on modifiable parameters for each detail of interest. The optimizer 312 of the illustrated example may receive and/or obtain the optimization data (e.g., the defined design variables, the defined constraints, the defined objective, and/or the optimization algorithm) via, for example, the user input interface 318 and/or the file manager 322.

The optimizer 312 then updates the shell element gauges in the finite element model input file (e.g., FEM2) (block 1108). For example, the optimizer 312 adjusts (e.g., increases) a gauge of each of the shell elements identified based on the optimization design variable values provided at block 1106. For example, if the optimization data indicates that a thickness of a shell element or a detail of interest must be at least greater than pre-determined value, the optimizer 312 adjusts the shell element thickness that may be less than the pre-determined value to at least the pre-determined value (or greater). The optimizer 312 produces an updated finite element model input file (e.g., FEM3) having the updated shell element gauge values.

The optimizer 312 of the illustrated example updates the fastener stiffness values in the finite element model input file based on the adjusted shell element gauge values (block 1110). For example, the optimizer 312 receives the modified finite element model input file (e.g., FEM3) and the spring element IDs at the negative margin locations and updates the spring elements based on the current thickness values of the shell element attached to the fastener. The optimizer, for example, creates a modified or updated finite element model input file (e.g., FEM4) including the updated stiffness values based on the updated gauge values of the shell element(s).

A finite element analysis is conducted on the modified input file (e.g., FEM4) to obtain mass and unit stress values of the example modified model (block 1112). For example, the finite element manager 306 provides the modified finite element model input file (FEM4) to a finite element analysis program via the input/output interface 314. The finite element analysis program performs a finite element analysis based on the input file parameters (FEM4) and provides the mass and stress per unit load output file (e.g., FEoutput'). In some examples, the finite element manager 306 retrieves or obtains the finite element output file (e.g., FEoutput') from the finite element analysis program and communicates the file to the file manager 322. In some examples, the file manager 322 may retrieve the output file from a finite element analysis program performing the modeling analysis on a system or computer remotely located from the finite element manager 306 and/or the fatigue analyzer system 300. In some examples, the finite element manager 306 performs the finite element analysis of the modified finite element model input file (e.g., FEM4). In some examples, the method performed by block 1112 is substantially similar and/or identical to the block 402 of FIG. 4 except that the modified finite element model input file (FEM4) is analyzed instead of the finite element model input file (FEM1).

The input file builder 308 prepares the modified input files for the pre-fatigue analysis and post-fatigue analysis (block 1114). For example, the input file builder 308, the pre-fatigue analyzer 324, and/or the post-fatigue analyzer 326 receive and/or obtain the modified finite element output (FEoutput'), the fatigue template provided by the fatigue template generator 302, and the modified finite element model input file (FEM4) used to calculate unit stress and mass for the details of interest from, for example, the file manager 322. The input file builder 308, the pre-fatigue analyzer 324, and/or the post-fatigue analyzer 326 of the illustrated example prepare output files for use by the fatigue determiner 310 as input files. The output files include, for example, a modified reference stress processor input file (fief pre-processor input'), a modified bearing pre-processor input file (bfr pre-processor input'), and the fatigue parameter(s) input file. These input files are discussed in greater detail in connection with the process 1500 of FIG. 15. In some examples, the method performed by block 1114 is substantially similar and/or identical to the block 404 of FIG. 4 and/or the method 700 of FIG. 7 except that the modified finite element model input file (FEM4) is analyzed instead of the finite element model input file (FEM1).

The fatigue determiner 310 and/or the fatigue pre-processor 328 conduct a pre-fatigue analysis (block 1116). For example, the fatigue determiner 310 and/or the fatigue pre-processor 328 receives the modified reference stress pre-processor input file and the modified bearing stress pre-processor input file from the input file builder 308 and/or the file manager 322. As a result of the pre-fatigue analysis at block 1116, a modified reference stress fatigue input file (e.g., fref fatigue input') and a modified bearing stress fatigue input file (e.g., fbr fatigue input') are created by the fatigue determiner 310 and/or the fatigue pre-processor 328. In some examples, the method performed by block 1116 is substantially similar and/or identical to the block 406 of FIG. 4 and/or the method 800 of FIG. 8 except that the modified finite element model input file (FEM4) is analyzed instead of the finite element model input file (FEM1).

The fatigue determiner 310 then performs a fatigue analysis (block 1118). For example, the fatigue determiner 310 and/or the fatigue processor 330 receives the modified reference stress fatigue input file and the modified bearing stress fatigue input file from, for example, the fatigue pre-processor 328. The fatigue processor 330 processes the information provided in the input files and generates a modified reference stress fatigue output file (e.g., fref fatigue output') and a modified bearing stress fatigue output file (e.g., fbr fatigue output'). In some examples, the fatigue processor 330 communicates the output files to the file manager 322. In some examples, the method performed by block 1118 is substantially similar and/or identical to the block 408 of FIG. 4 and/or the method 900 of FIG. 9 except that the modified finite element model input file (FEM4) is analyzed instead of the finite element model input file (FEM1).

A post-fatigue analysis is then performed by the fatigue post-processor 332 (block 1120). For example, the fatigue determiner 310 and/or the fatigue post-processor 332 receives and/or retrieves the modified reference stress fatigue output file (fref fatigue output'), the modified bearing stress fatigue output file (fbr fatigue output'), the fatigue parameter(s) file, and the RcFactor file from, for example, the file manager 322 and/or respective ones of the fatigue determiner 310, the input file builder 308, the RcFactor determiner 304 and/or the fatigue analyzer system 300. The fatigue post-processor 328, for example, processes the information in the received or retrieved files and calculates fatigue margins for each structural detail of interest based on the modified thicknesses and/or gauges provided in the modified input file (FEM4). In some examples, the fatigue post-processor 328 outputs the modified fatigue margins (e.g., a fatigue margins file) for each structural element or detail of interest. The modified fatigue margins provided by the output file are calculated by a fatigue margin equation using flight operating stress values in conjunction with stress-dependent and stress-independent input parameters. In some examples, the method performed by block 1120 is substantially similar and/or identical to the block 410 of FIG. 4 and/or the method 1000 of FIG. 10 except that the modified finite element model input file (FEM4) is analyzed instead of the finite element model input file (FEM1).

When the modified fatigue margins have been determined by the fatigue determiner 310, the optimizer 312 determines optimization convergence (block 1122). Optimization convergence may be achieved or met when, for example, a dimensional value of a detail of interest is modified to the smallest possible value while having positive fatigue margin. Some examples of optimization convergence are disclosed in connection with FIG. 19 below. If optimization convergence is achieved at block 1122, the optimization is complete. However, if optimization is not complete at block 1122, the method returns to block 1108 and continues iteration of adjusted shell thickness values until convergence is achieved at block 1122. For example, at block 1108, the shell element gauges are modified or changed to a different value based on the optimization setup parameters, and the processes of blocks 1108-1122 are performed with the modified shell element gauges until convergence is achieved.

Figure 12:
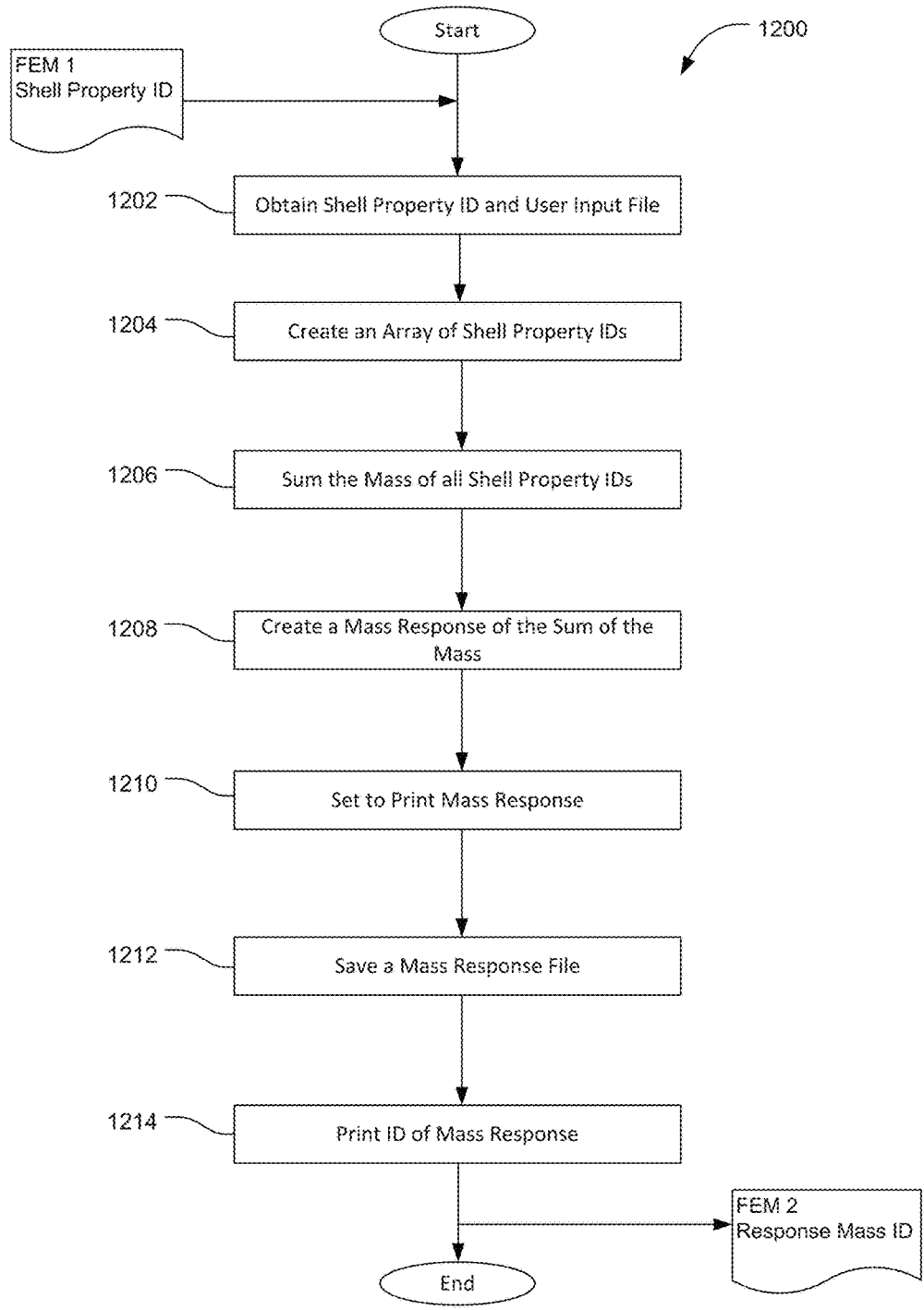

FIG. 12 is a flowchart of an example method 1200 that may be used to implement block 1104 of the example method 1100 of FIG. 11 and/or the optimizer 312 of the finite analysis system 300 of FIG. 3. The optimizer 312 of the illustrated example obtains, receives and/or retrieves the finite element model input file (FEM1) and the shell property ID file from the fatigue determiner 310 provided, for example, the file manager 322 (block 1202). As noted above, the finite element model input file (FEM1) is a user defined input file and the shell property ID file is provided by the fatigue determiner 310 at block 410 of the example method 400 and/or block 1016 of the example method 1000 of FIG. 10.

The optimizer 312 creates an array associated with the shell property ID values (block 1204). The optimizer 312 sums the mass of all the shell properties identified in the shell property ID file for each detail of interest (block 1206) and creates a mass response ID that sums the mass (block 1208). The optimizer 312 sets the finite element model input file (FEM1) to print the mass response ID in an output and saves the modified finite element model input file with the mass response ID as, for example, FEM2 (blocks 1210 and 1212). The optimizer 312 prints the mass response in the response mass ID file (block 1214). Thus, the optimizer 312 outputs the modified finite element model input file (FEM2) and the response mass ID file.

Figure 13:
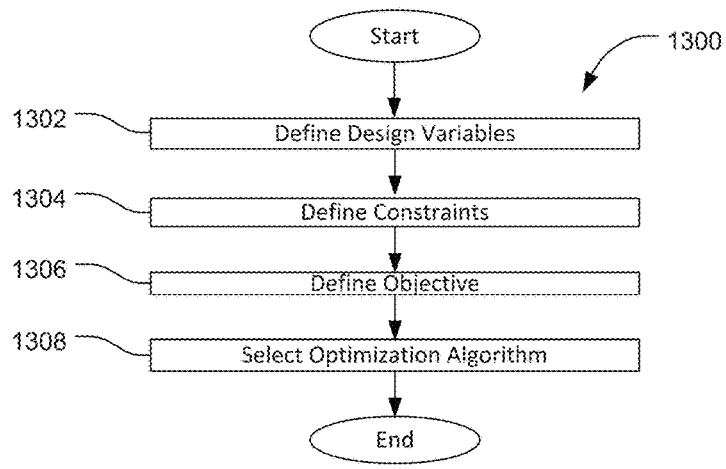

FIG. 13 is a flowchart of an example method 1300 that may be used to implement block 1106 of the example method 1100 of FIG. 11 and/or the optimizer 312. The optimizer 312 identifies and/or defines optimization criteria and/or constraints received, for example, via the user input interface 318 and/or the finite element model input file (FEM1). For example, the optimizer 312 identifies and/or defines design variables (block 1302), constraints (1304), objectives (block 1306) and/or optimization algorithm (block 1308) of the identified properties and/or details of interest. For example, the design variables may include, but not be limited to, modifying only the details of interest identified with the negative fatigue margin, modifying the thickness of the shell element, modifying the diameter of a fastener, etc. These design variables may have boundaries that include, but are not limited to, limiting modification of a dimensional value(s) and/or parameter(s) over a defined range such as, for example, a minimum and/or maximum thickness or gauge value for the shell elements of each detail of interest, a minimum/maximum value of a diameter of a fastener, and/or any other dimensional parameter(s), etc. The constraints may include, but are not limited to, limiting all or selected calculated fatigue margins to be positive. The design objective, for example, may be optimizing the details of interest to minimize a response mass, minimize a number of fasteners, minimize a diameter of the fasteners, minimize a thickness of the shell element, limiting the design to a service goal of at least 30 years, etc. The optimization algorithm is determined based on the design variables, the constraints, and/or the objectives selected, defined and/or determined.

Figure 14:
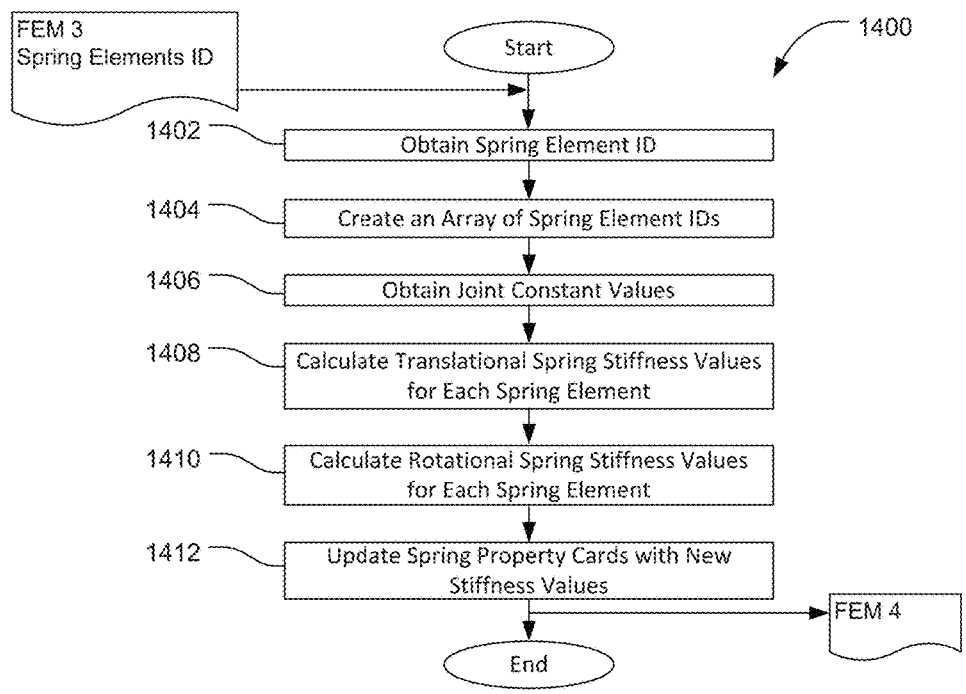

FIG. 14 is a flowchart of an example method 1400 that may be used to implement block 1110 of the example method 1100 of FIG. 11 and/or the optimizer 312. To update the fastener stiffness values in the modified finite element model file (FEM3), the optimizer 312 obtains or retrieves the sprint element identification provided by the fatigue determiner 310 in the spring element ID file (block 1402). The optimizer 312 creates an array of the spring elements identified in the sprint element ID file (block 1404). The optimizer 312 then obtains the joint constant values for each identified spring element, where a joint may consist of the spring and the attached shell and bar elements (block 1406). To obtain the joint constant values, for example, the optimizer 312 identifies the shell IDs and the Bar element IDs in the modified finite element model input file (FEM3). The optimizer 312 then obtains, for example, Young's Modulus of the fasteners identified (Ed), Young's Modulus of the attached plate or shell elements identified (E), Poisson's ratio of the attached plate or shell elements identified (v), the thickness of the attached plate or shell element identified (t), a translational spring stiffness ($K_1$ and $K_2$) of the fasteners identified ($S_{xbt}$ and $S_{ybt}$), rotational spring stiffness ($K_4$ and $K_5$) of the fasteners identified ($S_{xbr}$ and $S_{ybr}$), and/or any other constant or spring value needed to update stiffness values of the fasteners when modifying the dimensional characteristic(s) of the plates or shell elements attached via the fasteners. The spring values and/or constants may be obtained via a look-up table stored in the data storage 320.

The optimizer 312 then calculates or updates the translational spring stiffness values for each spring element identified in the spring elements ID file (block 1408). To calculate the translational spring stiffness values, the optimizer 312 may employ the following equation:

$$S_{xbt} = S_{ybt} = \frac{t}{\frac{1-v^2}{E} + \frac{1}{E_{cf}}} \qquad \text{Equation 2}$$

where, $S_{xbt}$ is the translational spring stiffness ($K_1$), $S_{ybt}$ is the translational spring stiffness ($K_2$), v is Poisson's ratio of the attached plate or shell elements, $E_{cf}$ is Young's Modulus of the fasteners (e.g., Hi-Lok fasteners), and E is Young's Modulus of the attached plate or shell elements.

The optimizer 312 then calculates or updates the rotational spring stiffness values for each spring element identified in the spring elements ID file (block 1410). To calculate the rotational spring stiffness values, the optimizer 312 may employ the following equation:

$$S_{xbr} = S_{ybr} = \frac{1}{12} \cdot \frac{t^3}{\frac{1-v^2}{E} + \frac{1}{E_{cf}}} \qquad \text{Equation 3}$$

where, $S_{xbr}$ is the rotational spring stiffness ($K_4$), $S_{ybr}$ is the rotational spring stiffness ($K_5$), v is Poisson's ratio of the attached plate or shell elements, $E_{cf}$ is Young's Modulus of the fasteners (e.g., Hi-Lok fasteners), and E is Young's Modulus of the attached plate or shell elements.

The optimizer 312 updates the finite element model input file with the new stiffness values provided at blocks 1408 and 1410 (block 1412). For example, the optimizer 312 saves the updated finite element model input file with a new file name (e.g., FEM 4).

Figure 15:
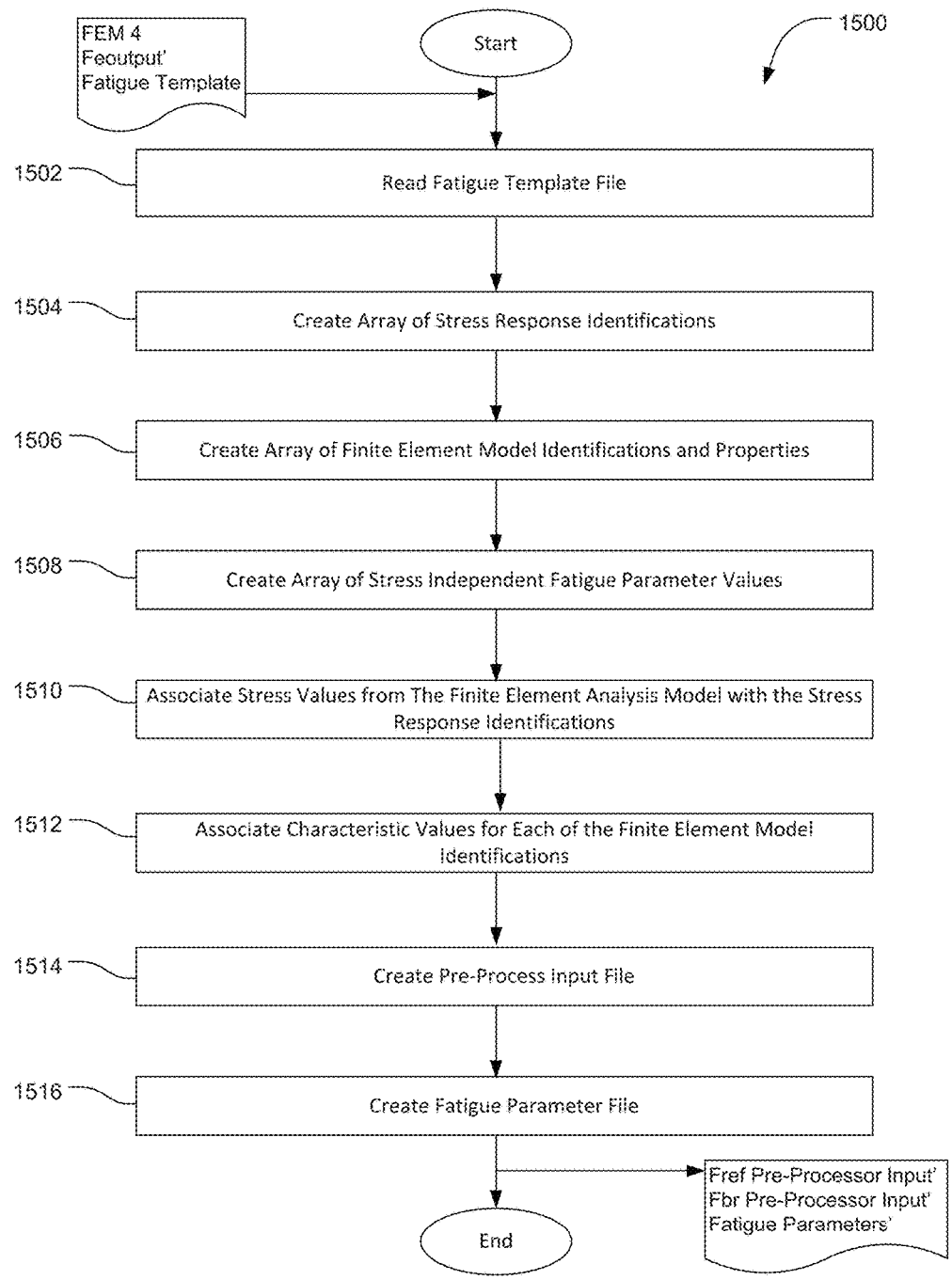

FIG. 15 illustrates is a flowchart of an example method 1500 that may be used to implement the example block 1114 of the example method 1100 of FIG. 11 and/or the input file builder 308 of the example fatigue analyzer system 300 of FIG. 3. The input file builder 308 and/or the pre-fatigue analyzer 324 of the illustrated example read the fatigue template file generated by the fatigue template generator 302 (block 1502). The input file builder 308 and/or the pre-fatigue analyzer 324 create an array of stress response identification(s) for each detail of interest (block 1504). For example, each array of stress response identifications include at least one of reference stress identification and a bearing stress identification for each detail of interest selected. The input file builder 308 and/or the pre-fatigue analyzer 324 of the illustrated example also create an array of finite element model identifications and properties (block 1506). For example, the array may include finite element model identifications for each spring element (e.g., for each fastener of the selected detail of interest) and finite element properties corresponding to fastener diameter, a plate thickness for each shell element identified, and stack-up thickness (e.g., of the joint 212 or 214) for each detail. The input file builder 308 and/or the pre-fatigue analyzer 324 of the illustrated example create an array of stress independent fatigue parameter values (e.g., DFR stress-independent values) for each detail of interest (block 1508).

The input file builder 308 and/or the post-fatigue analyzer 326 associates the unit load stress values from the modified finite element output file (FE output') with the stress response identifications provided by the pre-fatigue analyzer 324 (block 1510). The input file builder 308 and/or the post-fatigue analyzer 326 of the illustrated example associates characteristic values for each of the finite element model identifications assigned by the pre-fatigue analyzer 324 (block 1512). For example, the characteristics may include, but are not limited to, the diameter of each fastener, plate thickness values, stack-up thickness values, etc. The input file builder 308 and/or the post-fatigue analyzer 326 create modified pre-process input files (e.g., modified reference stress pre-processor inputs and modified bearing stress pre-processor input files) based on the modified finite element model input file (FEM 4) (block 1514). The input file builder 308 and/or the post-fatigue analyzer 326 also create a modified fatigue parameter file (fatigue parameters') (block 1516). In some examples, the method 1500 is substantially similar and/or identical to the method 700 of FIG. 7 except that the modified finite element model input file (FEM4) is analyzed instead of the finite element model input file (FEM1).

Figure 16:
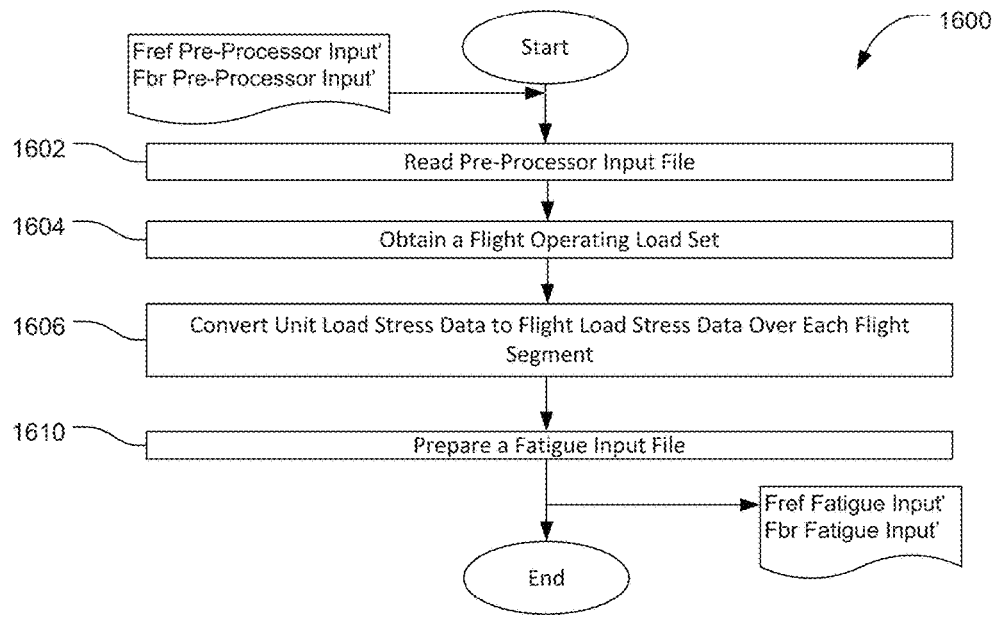

FIG. 16 illustrates a flowchart of an example method 1600 that may be used to implement the example block 1116 of the example method 1100 of FIG. 11 and/or the example fatigue pre-processor 328 and/or the example fatigue determiner 310 of the example fatigue analyzer 300 of FIG. 3. The example fatigue determiner 310 and/or the example fatigue pre-processor 328 reads the modified pre-processor input file (Fref Pre-Processor Input' and Fbr Pre-Processor Input') provided by the input file builder 308 (block 1602). The example fatigue determiner 310 and/or the example fatigue pre-processor 328 obtain the flight operating load set (block 1604). In some examples, the flight operating load set includes flight stress data over each flight segment of a flight envelope (e.g., taxiing, takeoff, landing, cruise, maneuvering, etc.). The example fatigue determiner 310 and/or the example fatigue pre-processor 328 converts the unit load stress data to the flight load stress data over each flight segment (block 1606). The example fatigue determiner 310 and/or the example fatigue pre-processor 328 prepare a modified fatigue input file (e.g., Fref Fatigue Input' and Fbr Fatigue Input') for use by the fatigue processor 330 (block 1610). In some examples, the method 1600 is substantially similar and/or identical to the method 800 of FIG. 8 except that the modified finite element model input file (FEM4) is analyzed instead of the finite element model input file (FEM1).

Figure 17:
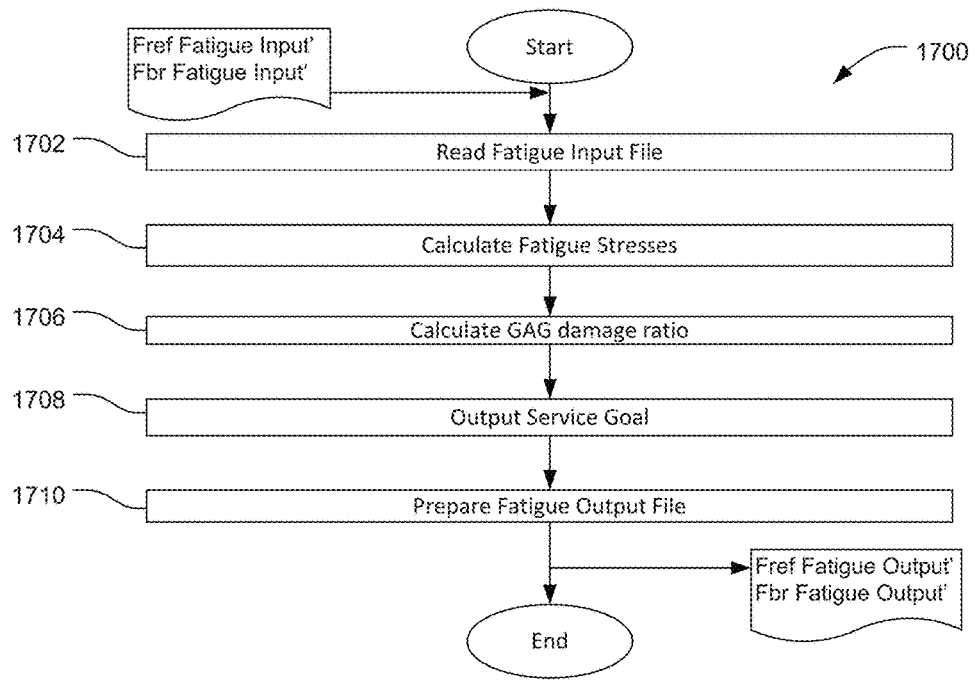

FIG. 17 illustrates an example flowchart of an example method 1700 that may be used to implement the example block 1118 of the example method 1100 of FIG. 11 and/or the example fatigue processor 330 and/or the example fatigue determiner 310 of the example fatigue analyzer 300 of FIG. 3. The example fatigue determiner 310 and/or the example fatigue processor 330 reads the fatigue input file (e.g., fref fatigue input' and fbr fatigue input') provided by the fatigue pre-processor 328 (block 1702). The example fatigue determiner 310 and/or the example fatigue processor 330 calculate fatigue stresses (block 1704). For example, the fatigue stresses include minimum and maximum fatigue operating stresses over each flight segment for each detail of interest. The example fatigue determiner 310 and/or the example fatigue processor 330 also calculate a GAG damage ratio (block 1706). In addition, the example fatigue determiner 310 and/or the example fatigue processor 330 outputs a service goal (e.g., the number of flights and/or years of service) (block 1708). The example fatigue determiner 310 and/or the example fatigue processor 330 prepare a modified fatigue output file (block 1710). For example, the modified fatigue output file includes the fatigue stress values, the GAG damage ratio value and the service goal value and may include a modified reference stress fatigue output file (fref fatigue output') and a modified bearing stress fatigue output file (fbr fatigue output'). In some examples, the method 1900 is substantially similar and/or identical to the method 900 of FIG. 9 except that the modified finite element model input file (FEM4) is analyzed instead of the finite element model input file (FEM1).

Figure 18:
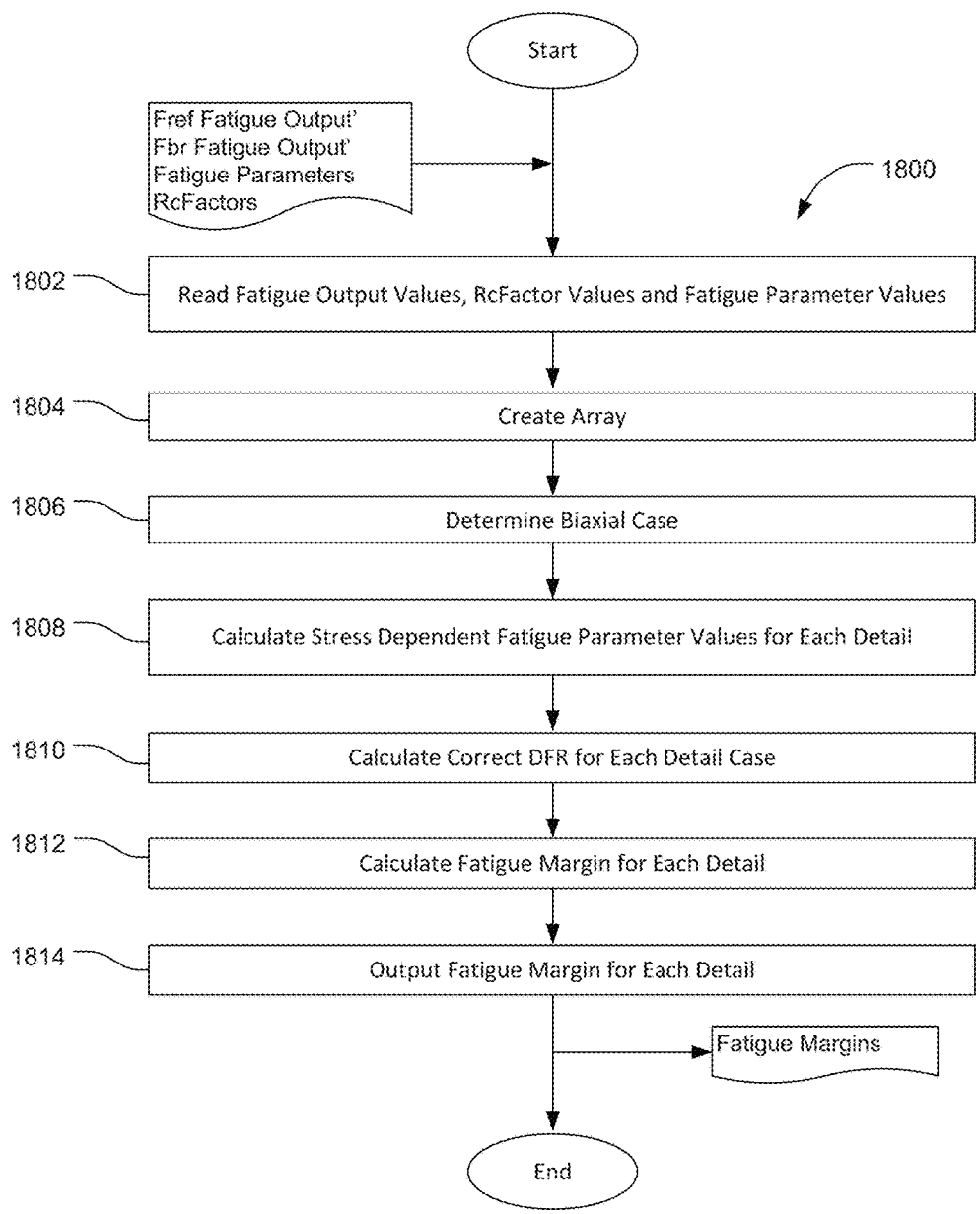

FIG. 18 illustrates a flowchart of an example method 1800 that may be used to implement the example block 1120 of the example method 1100 of FIG. 11 and/or the example fatigue post-processor 332 and/or the example fatigue determiner 310 of the example fatigue analyzer 300 of FIG. 3. The example fatigue post-processor 332 and/or the example fatigue determiner 310 of the illustrated example reads, obtains and/or retrieves the modified fatigue output values, RcFactor values and the fatigue parameter values (block 1802). For example, the fatigue post-processor 332 reads the modified reference stress fatigue output file (fief fatigue output') and the modified bearing stress fatigue output file (fbr fatigue output') provided by the fatigue processor 330, the RcFactor values provided by the RcFactor determiner 304, and the fatigue parameters provided by the input file builder 308. For example, the fatigue post-processor 332 reads, obtains and/or retrieves the minimum and maximum fatigue stresses, GAG damage ratio value, service goal for critical flight segment of each detail, material constants for each detail (e.g., via a look-up table and/or the input file builder 308), fastener diameter, plate thickness, stack-up thickness, and/or information from the user input interface 318, the file manager 322, etc.

The example fatigue post-processor 332 and/or the example fatigue determiner 310 uses the information provided at block 1802 to create an array (block 1804). The array, for example, includes information including, but not limited to, RcFactors for each detail, stress independent fatigue parameter values, finite element model identification numbers for shell and bar element properties and spring elements, finite element model identification numbers for fastener diameter, plate thickness, and stack-up thickness for each detail. The example fatigue post-processor 332 also obtains and/or retrieves the operating fatigue stresses and determines the biaxial case (block 1806). The example fatigue post-processor 332 then calculates the stress dependent fatigue parameter values for each detail of interest (block 1808). With the biaxial case and the stress dependent fatigue parameters known or determined, the example fatigue post-processor 332 calculates the DFR value for each detail of interest (block 1810). For example, the example fatigue post-processor 332 determines the DFR using both stress-dependent and stress-independent fatigue parameters, the RcFactors, and the biaxial case. Once the DFR value is calculated, the fatigue margin for each detail of interest is calculated (block 1812). For example, the fatigue margin for each detail of interest may be calculated using the DFR determined from stress-dependent values and stress-independent values, fatigue stresses, material constants, the biaxial case, etc. The example fatigue post-processor 332 and/or the example fatigue determiner 310 provides a modified output file with the fatigue margins for each detail of interest (block 1814). In some examples, the method 1800 is substantially similar and/or identical to the method 1000 of FIG. 10 except that the modified finite element model input file (FEM4) is analyzed instead of the finite element model input file (FEM1) and the method 1800 does not output the shell property identification file and a spring element identification file for each detail of interest.

Figure 19:
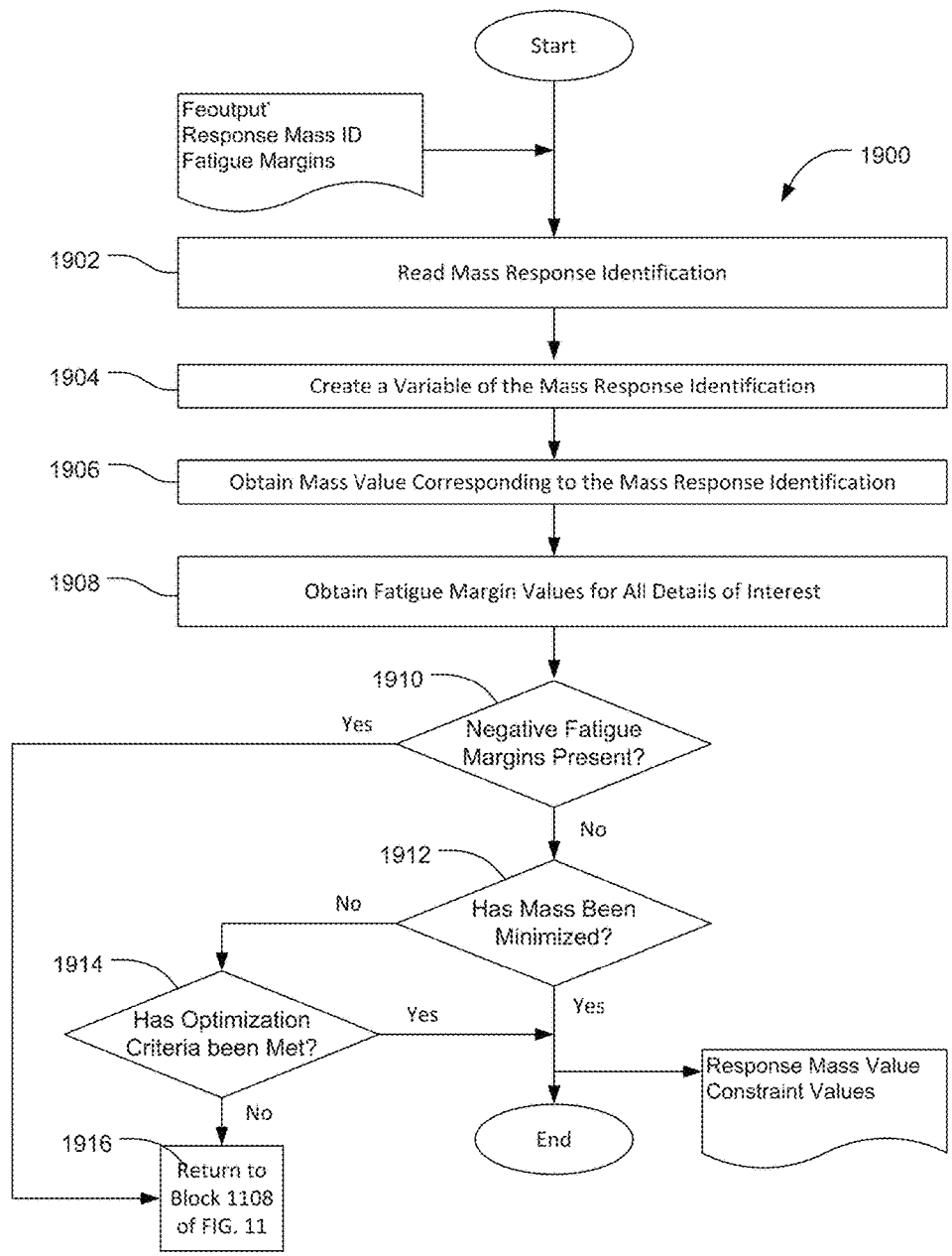

FIG. 19 illustrates a flowchart of an example method 1900 that may be used to implement the example optimizer 312 of the example fatigue analyzer 300 of FIG. 3. The optimizer 312 of the illustrated example reads the mass response identification (block 1902). For example, the optimizer 312 reads the response mass ID file provided at block 1104 of the example method 1100 of FIG. 11 and obtains the identification number of the mass response that sums the mass of the properties from the shell property identification file. The optimizer 312 creates a variable of the mass response identification (block 1904). The optimizer 312 then determines or obtains a mass value corresponding to the mass response identification (block 1906). The optimizer 312 also obtains a fatigue margin value for all details of interest identified in the fatigue margins file (block 1908). The optimizer 312 determines if any negative fatigue margins are present (block 1910). If all the fatigue margins are positive at block 1910, the optimizer 312 determines if the mass of each detail of interest has been minimized (block 1912). For example, to determine if the mass has been minimized, the optimizer 312 determines if there has been minimal change in mass over two consecutive iterations (e.g., through blocks 1108-1122 of FIG. 11). For example, a minimal change in mass over two iterations may include, for example, determining that the change in mass over two consecutive iterations is less than between approximately zero percent and approximately one percent. If the mass has been minimized at block 1912, the optimizer 312 outputs a value of the combined mass of all shell properties (e.g., thicknesses/gauges) at the negative margin location for the current iteration of the optimization (e.g., Objective Value) and a value of the fatigue margins for all details of interest for the current iteration of the optimization (e.g., Constraint Values).

If the mass has not been minimized at block 1912, the optimizer 312 determines if the optimization criteria has been met (block 1914). For example, the optimizer 312 determines if the optimization criteria provided at block 1106 of the example method 1100 of FIG. 11 has been met. If the optimization criteria at block 1914 has not been met, then the optimizer 312 conducts another iteration by returning to, for example, block 1108 of the example method of FIG. 11 and updates shell element gauges in the finite element model file (block 1916). Similarly, if a fatigue margin is negative at block 1910, the optimizer 312 conducts another iteration by returning to, for example, block 1108 of the example method of FIG. 11 and updates shell element gauges in the finite element model file (block 1916).

Upon completion of the convergence and/or optimization, the example optimizer 312 may communicate the optimized characteristic(s) (e.g., the shell element thicknesses) to the file manager 322. In some examples, the optimizer 312, the file manager 322 and/or the fatigue analyzer system 300 may output, command, instruct, transfer and/or otherwise communicate the optimized characteristic(s) and/or all the dimensional characteristic(s) of the details of interest analyzed in the fatigue element model input file (e.g., FEM1, FEM4, etc.) to, for example, a remote location or system. For example, the remote location or system may include a machine to construct the details of interest and/or the structural components based on the optimized characteristic(s) of the modified details of interest and/or all the details of interest analyzed by the fatigue analyzer system 300 of FIG. 3. In some examples, the fatigue analyzer system 300 of FIG. 3 instructs a machine to manufacture and/or construct the details of interest based on the optimized dimensional characteristic(s).

Figure 20:
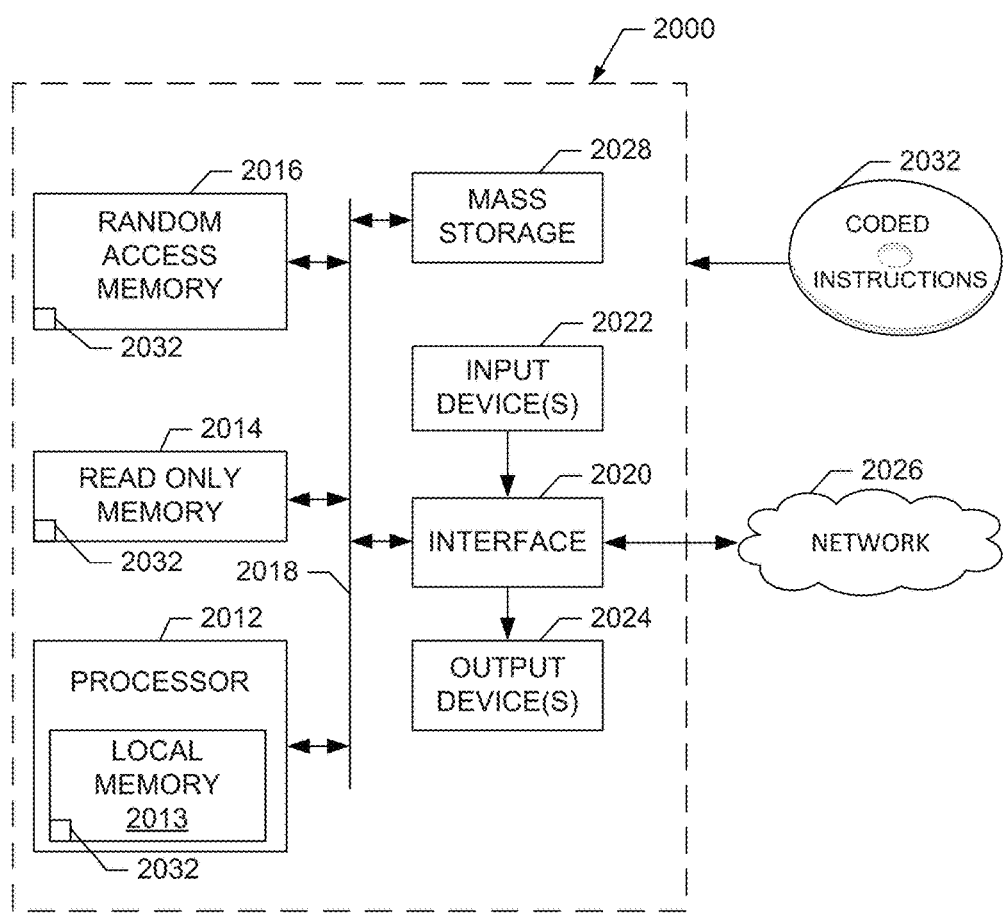
FIG. 20 is a block diagram of an example processor platform 2000 capable of executing the instructions to perform the methods of FIGS. 4-19 to implement the system of FIG. 3.

FIG. 20 is a block diagram of an example processor platform 2000 capable of executing the instructions of FIGS. 4-19 to implement the apparatus of FIG. 3. The processor platform 2000 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 2000 of the illustrated example includes a processor 2012. The processor 2012 of the illustrated example is hardware. For example, the processor 2012 can be implemented by one or more integrated circuits, logic circuits, microprocessors or controllers from any desired family or manufacturer.

The processor 2012 of the illustrated example includes a local memory 2013 (e.g., a cache). The processor 2012 of the illustrated example is in communication with a main memory including a volatile memory 2014 and a non-volatile memory 2016 via a bus 2018. The volatile memory 2014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 2014, 2016 is controlled by a memory controller.

The processor platform 2000 of the illustrated example also includes an interface circuit 2020. The interface circuit 2020 may be implemented by any type of interface standard, such as an Ethernet interface, a universal serial bus (USB), and/or a PCI express interface.

In the illustrated example, one or more input devices 2022 are connected to the interface circuit 2020. The input device(s) 2022 permit(s) a user to enter data and commands into the processor 2012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2024 are also connected to the interface circuit 2020 of the illustrated example. The output devices 2024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 2020 of the illustrated example, thus, typically includes a graphics driver card, a graphics driver chip or a graphics driver processor.

The interface circuit 2020 of the illustrated example also includes a communication device such as a transmitter, a receiver, a transceiver, a modem and/or network interface card to facilitate exchange of data with external machines (e.g., computing devices of any kind) via a network 2026 (e.g., an Ethernet connection, a digital subscriber line (DSL), a telephone line, coaxial cable, a cellular telephone system, etc.).

The processor platform 2000 of the illustrated example also includes one or more mass storage devices 2028 for storing software and/or data. Examples of such mass storage devices 2028 include floppy disk drives, hard drive disks, compact disk drives, Blu-ray disk drives, RAID systems, and digital versatile disk (DVD) drives.

Coded instructions 2032 to implement the methods of FIGS. 4-19 may be stored in the mass storage device 2028, in the volatile memory 2014, in the non-volatile memory 2016, and/or on a removable tangible computer readable storage medium such as a CD or DVD. Accordingly, an example apparatus disclosed herein includes a processor and a memory comprising coded instructions that, when executed, cause a machine to obtain mass and unit stress values of a plurality of details of interest of a structural component, calculate fatigue margins for each of the details of interest, identify among the calculated fatigue margins any negative fatigue margins associated with these details of interest, and adjust, via a processor, a dimensional characteristic of each detail of interest associated with the negative fatigue margin(s) until a positive fatigue margin at each detail of interest is obtained. The apparatus may further be coupled to equipment for producing the optimized structural component having one or more adjusted dimensional characteristics for one or more particular details of interest, such that a structural component with a positive fatigue margin and minimal weight is obtained. The equipment may include, for example, Numerical Controlled equipment for laying up composite materials to form one or more details of interest of the structural component to a particular dimensional thickness, or for machining one or more details of interest of the structural component to a particular dimensional thickness. The structural component may also be produced by three-dimensional printing equipment, additive manufacturing equipment for incrementally adding material to adjust the dimensional thickness of one or more details of interest of the structural component, or other similar equipment suitable for producing the structural component.

From the foregoing, it will be appreciated that the above disclosed methods, apparatus and articles of manufacture provide automation for complex, multi-staged fatigue analysis that uses multiple software programs and operating systems; automatic creation of input files to a fatigue preprocessor based on finite element analysis results; automatic post-processing of fatigue analysis results to calculate fatigue margins using fatigue stresses; automatic reporting of fatigue margins at all details of interest in, for example, a visual engineering environment; automatic identification of finite element model property and element cards at negative fatigue margin locations; automatic finite element modeling updates to calculate and output design response of summed mass of shell element thickness properties (that are adjusted during optimization) at negative fatigue margin locations; automatic finite element modeling updates to ensure correct stiffness representation of fastener models as local gauge updates are made at negative fatigue margin locations; and/or automatic correction of negative fatigue margins using optimization.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
obtaining mass and unit stress values of a plurality of details of interest of a structural component;
calculating fatigue margins for each of the details of interest;
identifying among the calculated fatigue margins a negative fatigue margin associated with at least one particular detail of interest; and
adjusting, via a processor, a dimensional characteristic of only the particular detail of interest associated with the negative fatigue margin until a positive fatigue margin at the particular detail of interest is obtained.

2. The method of claim 1, further comprising performing a finite element analysis of a finite element model of the structural component defining a plurality of particular details of interest to obtain the mass and unit stress values of each of the particular details of interest, wherein the method individually adjusts a dimensional characteristic for each of the plurality of particular details of interest respectively until a positive fatigue margin at each particular detail of interest is obtained, such that a structural component with a positive fatigue margin is obtained with minimal impact to a weight of the structural component.

3. The method of claim 1, further comprising scaling the unit stress values based on a flight operating load.

4. The method of claim 3, further comprising generating a fatigue template file including stress response identifications for the fatigue margins to be calculated.

5. The method of claim 4, further comprising correlating the stress response identifications in the fatigue template file with the unit stress values for each detail of interest.

6. The method of claim 5, further comprising classifying structurally similar details of interest into geometrically similar groups.

7. The method of claim 6, further comprising determining a number of fasteners in each of the details of interest.

8. The method of claim 7, further comprising calculating RcFactors for the details of interest.

9. The method of claim 8, further comprising calculating a detail fatigue rating value based on stress-dependent and stress-independent variables.

10. The method of claim 9, further comprising determining the fatigue allowable for each detail of interest based on the detail fatigue rating value.

11. The method of claim 10, further comprising calculating minimum and maximum fatigue operating stresses over each flight segment for each detail of interest.

12. The method of claim 11, wherein identifying the negative fatigue margin comprises comparing the maximum fatigue operating stress with the fatigue allowable.

13. The method of claim 1, further comprising identifying an identification number and value of a shell element thickness of the detail of interest associated with the negative fatigue margin.

14. The method of claim 13, wherein adjusting the dimensional characteristic comprises adjusting the shell element thickness until the positive fatigue margin at the detail of interest is obtained.

15. The method of claim 14, wherein adjusting the shell element thickness comprises adjusting the shell element thickness only at a location at which the negative fatigue margin is detected.

16. The method of claim 13, further comprising determining optimization criteria for each detail of interest.

17. The method of claim 16, wherein adjusting the shell thickness comprises adjusting the shell element thickness based on the optimization criteria.

18. The method of claim 2, further comprising identifying at least one particular detail of interest having a positive fatigue margin to determine if a dimensional characteristic of the at least one particular detail of interest can be adjusted or reduced while still providing a positive fatigue margin, such that an optimized structural component with a positive fatigue margin is obtained with improved weight of the structural component.

19. The method of claim 18, further comprising the step of producing the optimized structural component having one or more adjusted dimensional characteristics for one or more particular details of interest, such that a structural component with a positive fatigue margin and minimal weight is obtained.

20. An apparatus comprising:

a processor; and a memory comprising instructions that, when executed, cause a machine to:

obtain mass and unit stress values of a plurality of details of interest of a structural component;

calculate fatigue margins for each of the details of interest;

identify among the calculated fatigue margins any negative fatigue margins associated with one or more of the details of interest; and adjust, via the processor, a dimensional characteristic of each detail of interest associated with the negative fatigue margins until positive fatigue margins at each detail of interest is obtained.

* * * * *